(12) United States Patent
Troy et al.

(10) Patent No.: US 10,633,066 B2
(45) Date of Patent: Apr. 28, 2020

(54) APPARATUS AND METHODS FOR MEASURING POSITIONS OF POINTS ON SUBMERGED SURFACES

(71) Applicant: The Boeing Company, Chicago, IL (US)

(72) Inventors: James J. Troy, Issaquah, WA (US); Scott W. Lea, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 15/936,954

(22) Filed: Mar. 27, 2018

(65) Prior Publication Data

US 2019/0300135 A1    Oct. 3, 2019

(51) Int. Cl.
| | |
|---|---|
| *B63G 8/00* | (2006.01) |
| *H04N 5/225* | (2006.01) |
| *G03B 17/06* | (2006.01) |
| *B63C 11/49* | (2006.01) |
| *G03B 17/48* | (2006.01) |
| *G03B 17/56* | (2006.01) |

(52) U.S. Cl.
CPC .............. *B63G 8/001* (2013.01); *B63C 11/49* (2013.01); *G03B 17/06* (2013.01); *G03B 17/48* (2013.01); *G03B 17/561* (2013.01); *H04N 5/2259* (2013.01); *B63G 2008/004* (2013.01); *B63G 2008/007* (2013.01); *B63G 2008/008* (2013.01)

(58) Field of Classification Search
CPC ......... B63G 8/001; B63C 11/49; G03B 17/06; G03B 17/48; G03B 17/561; G03B 17/00; G03B 17/08; G02B 23/22; H04N 5/2259
See application file for complete search history.

(56) References Cited

U.S. PATENT DOCUMENTS 3,814,045 A * 6/1974 Gray ..................... B60F 3/0015
                                                440/12.64
5,565,978 A    10/1996 Okubo et al.
(Continued)

OTHER PUBLICATIONS

"A Simple Underwater Video System for Laser Tracking"; Hsin-Hung Chen et al., IEEE(c) 2000; 0-7803-6551-8 (Year: 2000).*
(Continued)

*Primary Examiner* — Dramos Kalapodas
(74) *Attorney, Agent, or Firm* — Ostrager Chong Flaherty & Broitman P.C.

(57) ABSTRACT

Apparatus and methods for measuring a position of a point on a submerged surface. The apparatus includes: a platform; a liquid-tight pressure vessel fixedly coupled to the platform, wherein the liquid-tight pressure vessel is formed in part by an optically transparent enclosure; a pan-tilt mechanism coupled to the platform and disposed inside the liquid-tight pressure vessel; a camera mounted to the pan-tilt mechanism; a laser range meter affixed to the camera; and a refractive index sensor coupled to and disposed outside the liquid-tight pressure vessel. In accordance with one proposed implementation, the optically transparent enclosure is spherical, the pan-tilt mechanism has a pan axis and a tilt axis that intersect at a center of the optically transparent enclosure, and the laser range meter is located to emit a laser beam that is perpendicular to the optically transparent enclosure.

23 Claims, 24 Drawing Sheets

(56) References Cited

U.S. PATENT DOCUMENTS

| | | | |
|---|---|---|---|
| 6,304,289 B1* | 10/2001 | Sakai | B63C 11/42 |
| | | | 348/81 |
| 7,271,883 B2 | 9/2007 | Newell et al. | |
| 7,777,873 B2 | 8/2010 | Wang et al. | |
| 7,859,655 B2 | 12/2010 | Troy et al. | |
| 8,044,991 B2 | 10/2011 | Lea et al. | |
| 8,199,194 B2 | 6/2012 | Troy et al. | |
| 8,279,412 B2 | 10/2012 | Motzer et al. | |
| 8,447,805 B2 | 5/2013 | Troy et al. | |
| 8,542,353 B2* | 9/2013 | Christian | G01N 21/43 |
| | | | 356/128 |
| 8,738,226 B2 | 5/2014 | Troy et al. | |
| 9,182,487 B2 | 11/2015 | Troy et al. | |
| 9,185,364 B1* | 11/2015 | Odierna | H04N 5/2256 |
| 9,223,002 B2 | 12/2015 | Crowell | |
| 9,285,296 B2 | 3/2016 | Georgeson et al. | |
| 9,791,555 B2* | 10/2017 | Zhu | G01S 17/08 |
| 9,804,577 B1 | 10/2017 | Troy et al. | |
| 2002/0167726 A1 | 11/2002 | Barman et al. | |
| 2007/0201040 A1* | 8/2007 | Konetschny | G01S 1/70 |
| | | | 356/601 |
| 2008/0267450 A1 | 10/2008 | Sugimoto et al. | |
| 2010/0168918 A1 | 7/2010 | Zhao et al. | |
| 2011/0315164 A1* | 12/2011 | DesOrmeaux | B08B 9/0933 |
| | | | 134/21 |
| 2012/0189289 A1* | 7/2012 | Ghali | G03B 17/08 |
| | | | 396/27 |
| 2012/0327187 A1 | 12/2012 | Troy et al. | |
| 2014/0276768 A1* | 9/2014 | Juergens | A61B 18/1233 |
| | | | 606/34 |
| 2015/0268033 A1 | 9/2015 | Troy et al. | |
| 2016/0198069 A1* | 7/2016 | Boyle | G06T 3/4038 |
| | | | 348/81 |
| 2018/0203449 A1* | 7/2018 | Tavares | G03B 29/00 |
| 2019/0127034 A1* | 5/2019 | Larson | G05D 1/0875 |

OTHER PUBLICATIONS

"An Underwater Laser Vision System for Relative 3-D Posture Estimation to Mesh-Like Targets" Christos Constantinou et al., (c) IEEE 978-1-5090-3762-9 (Year: 2016).*

* cited by examiner

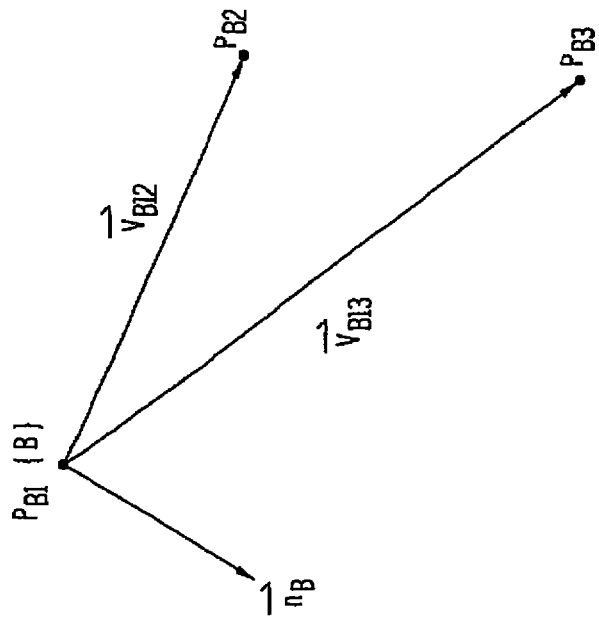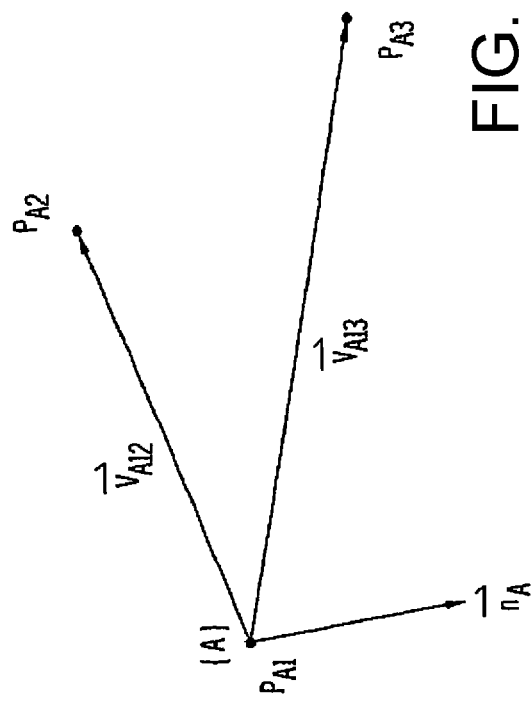
FIG. 20

APPARATUS AND METHODS FOR MEASURING POSITIONS OF POINTS ON SUBMERGED SURFACES

BACKGROUND

This disclosure generally relates to systems and methods for performing non-destructive inspection activities, and more particularly to systems and methods for enabling non-destructive inspection of structures or objects submerged in liquid using a remotely controlled apparatus.

In-person human-based inspections and location measurement of structures and objects submerged in liquid (e.g., water) can be time consuming, expensive and difficult for an individual to perform. Examples of structures that pose significant inspection challenges include bridges, dams, levees, water treatment facilities, storage tanks, chemical processing plants, ships, oil drilling platforms, and spent nuclear fuel pools.

Utilizing an unmanned submersible vehicle, an operator can safely acquire images or other sensor data from structures submerged in liquid. The operator can initiate an automatic scanning process of structures without being placed in harm's way and without requiring cumbersome and expensive equipment, such as cranes or platforms. Various non-destructive inspection techniques, via such unmanned submersible vehicles, may be employed to detect the presence of an anomaly in a submerged structure or object, but determining the location and size of an anomaly in underwater environments has been a challenge.

SUMMARY

Finding and accurately measuring the locations of structural anomalies in a submerged structure or object can be a laborious task. An efficient and automated process for addressing this problem would be valuable to many organizations involved in building and maintaining structures having submerged surfaces. The subject matter disclosed in some detail below is directed to system and methods for accurately correlating inspection data acquired from submerged structures or objects with the positions of anomalies relative to a frame of reference.

More specifically, apparatus and methods for measuring the distance to a target object submerged in liquid and acquiring three-dimensional coordinates for that target object using a remotely operated submersible platform are disclosed below. The measurement system uses on-board sensors to acquire data and then uses computer processing techniques to provide discrete or continuous measurements of three-dimensional coordinates of points on a submerged surface of the target object.

In accordance with one proposed system, a local positioning system (including a pan-tilt mechanism, a camera mounted on the pan-tilt mechanism, and a laser range meter affixed to the camera) is placed inside a submersible liquid-tight pressure vessel for use in measuring points on the surface of a submerged object. The liquid-tight pressure vessel is formed in part by an optically transparent enclosure that surrounds the local positioning system. In particular, the laser range meter and optically transparent enclosure are configured to reduce refraction of laser light at the enclosure interfaces. In addition, a computer is configured to control the processing of measurement data to compensate for the effects of the liquid medium in which the enclosure is immersed on the speed of light emitted by the laser range meter and returned from the target object.

In accordance with one method disclosed in some detail below, a laser range meter is used to link adjacent measurement regions in a submerged environment with a common coordinate system. This feature enables three-dimensional measurement in submerged environments larger than the range of the instrument.

Although various embodiments of apparatus and methods for acquiring three-dimensional coordinate information for points on submerged target objects undergoing non-destructive inspection or some other maintenance operation are described in some detail later herein, one or more of those embodiments may be characterized by one or more of the following aspects.

One aspect of the subject matter disclosed in detail below is an apparatus for measuring a position of a point on a submerged surface, comprising: a platform; a liquid-tight pressure vessel fixedly coupled to the platform, wherein the liquid-tight pressure vessel is formed in part by an optically transparent enclosure; a pan-tilt mechanism coupled to the platform and disposed inside the liquid-tight pressure vessel; a camera mounted to the pan-tilt mechanism; a laser range meter affixed to the camera; a refractive index sensor (a.k.a. refractometer) coupled to and disposed outside the liquid-tight pressure vessel. In accordance with one proposed implementation, the optically transparent enclosure is spherical; the pan-tilt mechanism has a pan axis and a tilt axis that intersect at a center of the optically transparent enclosure; and the laser range meter is located to emit a laser beam that is perpendicular to the optically transparent enclosure at a multiplicity of different points of impingement on the optically transparent enclosure. The pan-tilt mechanism is capable of angle measurement and motion control. The speed of light of the liquid is determined using a refractive index sensor that measures the index of refraction in the liquid (equivalent to measuring the speed of light). This provides the real-time index of refraction data for the specific environment (which may change with temperature and salinity).

Another aspect of the subject matter disclosed in detail below is a method for measuring a position of a point on a submerged surface, comprising: coupling a laser range meter to a pan-tilt mechanism; installing the pan-tilt mechanism inside a liquid-tight pressure vessel formed in part by an optically transparent enclosure; submerging at least the optically transparent enclosure in a liquid; directing the laser range meter at pan and tilt angles such that a laser beam emitted by the laser range meter will impinge at a point on a surface submerged in the liquid; using the laser range meter to emit a laser beam while the laser range meter is directed at the pan and tilt angles; using the laser range meter to detect a portion of the laser beam returned from the point on the submerged surface; calculating a distance traveled by light emitted from and returned to the laser range meter; calculating a position of the point on the submerged surface based in part on the distance and the pan and tilt angles; and recording the position of the point on the submerged surface by storing digital data in a non-transitory tangible computer-readable storage medium.

In accordance with some embodiments, the method described in the preceding paragraph further comprises: installing a refractive index sensor outside the liquid-tight pressure vessel; using the refractive index sensor to measure an index of refraction of the liquid; and calculating a speed of light in the liquid based on the measured index of refraction. Calculating the distance traveled by light emitted from and returned to the laser range meter comprises taking into account the speed of light in the liquid through which the emitted and returned light propagates.

In accordance with some embodiments, the method described in the preceding paragraph further comprises using the laser range meter to link adjacent measurement regions in a submerged environment with a common coordinate system, wherein the submerged surface is a part of the submerged environment. In accordance with other embodiments, the method described in the preceding paragraph further comprises: calibrating the pan-tilt mechanism relative to a frame of reference; and converting the distance and pan and tilt angles into a Cartesian coordinate vector representing the position of the point in the frame of reference.

A further aspect of the subject matter disclosed in detail below is a method for inspecting and measuring a submerged surface of a structure comprising: (a) submerging a liquid-tight pressure vessel in a liquid; (b) ceasing movement of the liquid-tight pressure vessel; (c) using a laser range meter situated inside the liquid-tight pressure vessel and a refractive index sensor situated outside the liquid-tight pressure vessel to measure a distance separating the laser range meter from a point on the submerged surface of the structure while the liquid-tight pressure vessel is stationary; (d) using a camera situated inside the liquid-tight pressure vessel to capture an image of an area including the point on the submerged surface; and (e) calculating a position of the point on the surface based in part on the measured distance. This method may further comprise recording the image and the position of the point on the surface by storing digital data in a non-transitory tangible computer-readable storage medium and/or displaying the image and alphanumeric symbols representing the position of the point on a display screen.

Other aspects of apparatus and methods for acquiring three-dimensional coordinate information for points on submerged surfaces of target objects undergoing non-destructive inspection are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 20-22 are diagrams referred to in the description of an illustrative method for calculating a calibration matrix for coordinate system transformation.

Reference will hereinafter be made to the drawings in which similar elements in different drawings bear the same reference numerals.

DETAILED DESCRIPTION

For the purpose of illustration, systems and methods for acquiring three-dimensional coordinate information for objects submerged in liquid contained in a storage tank will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The submersible automated apparatuses disclosed herein each include a local positioning system. The structure and operation of such a local positioning system are fully disclosed in U.S. Pat. Nos. 9,285,296, 8,447,805 and 7,859,655, but for the sake of completeness, the structure and operation of a local positioning system in accordance with one embodiment will now be described in some detail. This local positioning system may be included in any one of the multiplicity of embodiments disclosed below.

Figure 1:
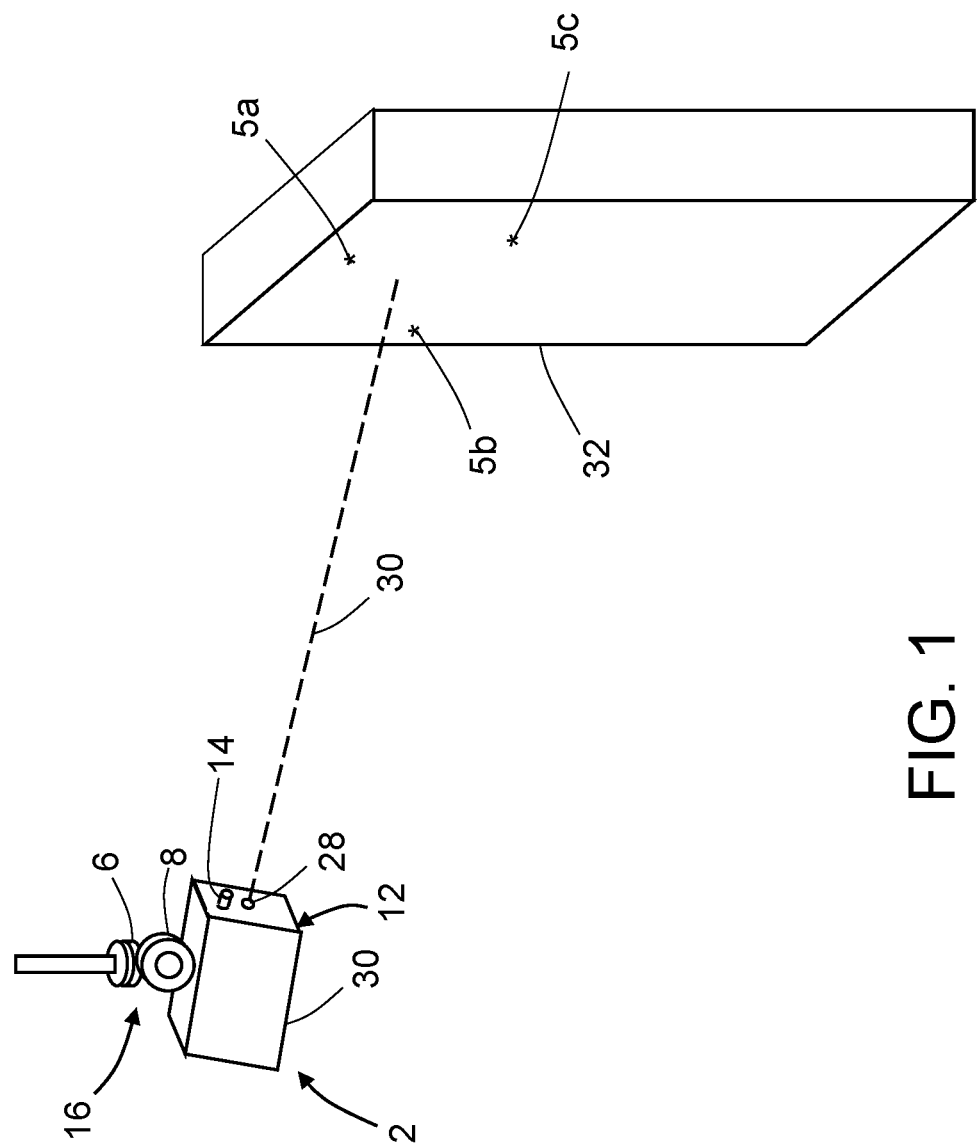
FIG. 1 is a diagram showing a local positioning system that includes a laser range meter which is emitting a laser beam (indicated by a dashed line) that impinges on a surface of a target object.

FIG. 1 is a diagram showing a local positioning system 2 that is supported by a support member 10. The local positioning system 2 includes a camera 12 having a camera housing 30 and an aperture 28, a laser range meter 14 affixed to the camera housing 30 above the aperture 28, and a pan-tilt mechanism 16. The pan-tilt mechanism 16 includes a pan unit 7 which is rotatably coupled to a distal end of the support member 10 and a tilt unit 8 which is rotatably coupled to the pan unit 7 and fixedly coupled to the camera housing 30. This arrangement allows the camera housing 30 to rotate about the pitch ad tilt axes of the pan-tilt mechanism 16. The pan-tilt mechanism is capable of angle measurement and motion control. The focal axis of the camera 12 and the axis of the laser range meter 14 are mutually parallel, The laser range meter 14 projects a laser beam along an aim direction vector 34 (indicated by a dashed line in FIG. 1) onto a target object 32 to form a laser point (not shown in FIG. 1) on a surface of the target object 32. The camera 12 may comprise a still camera (color and/or black and white) to obtain still images, a video camera to obtain color and/or black and white video, or an infrared camera to obtain infrared still images or infrared video of the target object 32. It may be possible to have a single camera that can perform the functions of all of these types.

Figure 2:
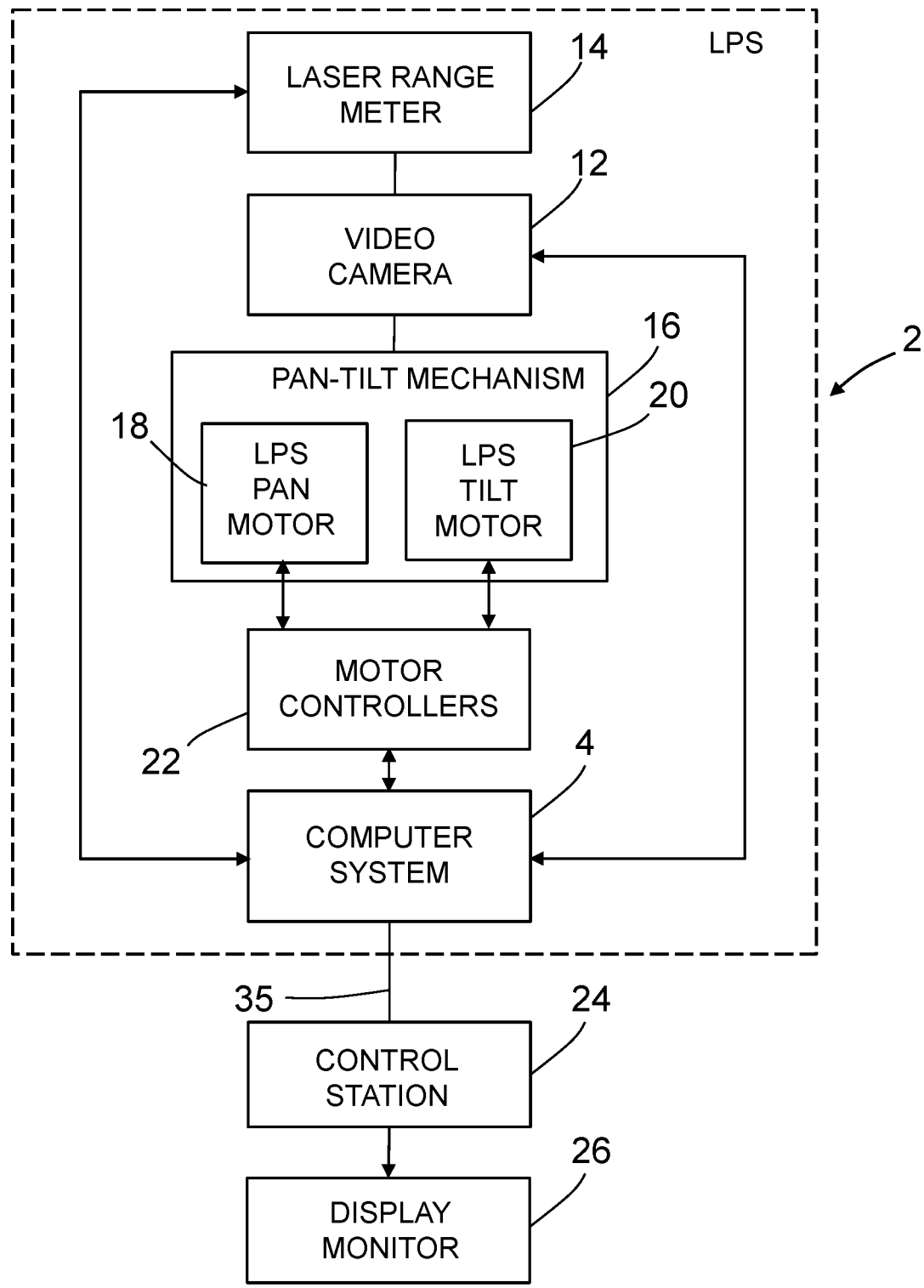
FIG. 2 is a block diagram identifying some components of a system for performing non-destructive inspection of a structure using a remotely controlled local positioning system.

FIG. 2 is a block diagram identifying some components of a system for performing non-destructive inspection of a structure using a local positioning system 2 that is remotely controlled from a control station 24 located outside the submerged environment. The local positioning system 2 further includes a computer system 4 that is programmed to control rotational motions of the pan-tilt mechanism 16 to adjust the focal axis of the camera 12 to selected angles around the vertical, azimuth (hereinafter "pan") axis and the horizontal, elevation (hereinafter "tilt") axis in response to commands from the control station 24. The computer system 4 is also programmed to control operation of the camera 12 and the laser range meter 14 in accordance with commands received from the control station 24.

The control station 24 may comprise a general-purpose computer system configured with programming for controlling operation of the local positioning system 2 by sending commands to the computer system 2 via a power/signal cord 36. For example, the control station 24 may send commands controlling the movements of the pan-tilt mechanism 16 and commands for activation of the camera 12 and laser range meter 14. More specifically, the computer system 4 controls the rotations of the pan unit 7 and tilt unit 8 (see FIG. 1) of the pan-tilt mechanism 16 by sending commands to the motor controllers 22 (see FIG. 2) which respectively control a pan motor 18 and a tilt motor 20. In response to commands from the control station 24, the computer system 4 also sends control signals for activating the camera 12 and the laser range meter 14 (e.g., via power/signal cord 36). The camera 12 may have automated (remotely controlled) zoom capabilities.

The computer system 4 is further programmed to send pan and tilt angle data to control station 24 via a power/signal cord 35. The computer system 4 is also programmed to receive image data from camera 12 for transmission to a control station 24 via power/signal cord 35. The computer system 4 is further programmed to receive range data from the laser range meter 14 for transmission to the control station 24 via power/signal cord 35. This range data is based on standard usage conditions i.e., in air at standard temperature and pressure.

Referring again to FIG. 1, an aim direction vector 34 that describes the orientation of the laser range meter 14 relative to a coordinate system of the laser range meter 14 (hereinafter "instrument coordinate system") is determined from the pan and tilt angles by the computer system at the control station 24. Using the laser range meter 14, the orientation of the aim direction vector 34 in the instrument coordinate system is measured when the laser beam emitted by the laser range meter 14 is in turn aligned with each of three calibration points 5a-5c on the surface of the target object 32. In this example, it is assumed that the positions of the three calibration points 5a-5c in the target object coordinate system are known. This method also includes measuring a distance (i.e., range) substantially along the aim direction vector 34 from the laser range meter 14 to each of the three calibration points 5a-5c. This method also includes calculating a calibration matrix which transforms a position defined in the instrument coordinate system to a position defined in the target object coordinate system using at least the measured orientations and distances in the instrument coordinate system corresponding to the three calibration points 5a-5c and the known positions of the three calibration points 5a-5c in the target object coordinate system.

The computer system at the control station 24 may be configured to measure coordinates of points on the target object 32 defined in the local coordinate system of the target object 32. In addition, the computer system at the control station 24 may be configured with programming for processing image data received from the camera 12 during an inspection operation. In particular, the computer system of the control station 24 may comprise a display processor configured with software for controlling a display monitor 26 to display images captured by the camera 12. The optical image field, as sighted by the camera 12, can be displayed on the display monitor 26. The computer system at the control station 24 causes the image data to be displayed on the screen of display monitor 26 by controlling the states of the pixels of the display screen in a well-known manner. Alphanumeric symbology representing the position coordinates of a point on the imaged surface on the target object 32 may be superimposed on the displayed image.

In accordance with one embodiment, the pan-tilt mechanism 16 comprises a pan unit 7 configured to rotate the camera 12 (and laser device mounted thereto) about a pan axis and a tilt unit 8 configured to rotate the camera 12 about a tilt axis (orthogonal to the pan axis) in response to control signals received from the computer system 4. Actuators (not shown in the drawings), such as servo-motors or the like, in the pan-tilt mechanism 16 may receive and respond to control signals from the computer system 4 by adjusting the angular rotation of the camera 12 about the pan and tilt axes, as well as the angular speed at which the camera 12 rotates about the pan and tilt axes. The pan-tilt mechanism 16 further comprises pan and tilt rotational encoders (not shown in the drawings) that send signals representing current angular position data back to the motor controllers 22. The control signals applied to the pan-tilt mechanism 16 may be computed by the computer system 4 in response to user instructions (e.g., manipulation of an input device that is part of the control station 24) or an automatic scan path generator.

The laser range meter 14 may be incorporated inside the camera housing 30 of camera 12 or mounted to the outside of camera housing 30 in such a way that it transmits a laser beam along the aim direction vector 34. The laser range meter 14 is configured to measure the distance to any surface on the target object 32, which may include any visible features on or any marker attached to the target object 32. In accordance with some embodiments, the laser range meter 14 uses a laser beam to determine the distance to the target object 32. The most common form of laser range meter operates on the time-of-flight principle by sending a laser pulse in a narrow beam towards the target object 32 and measuring the time taken by the pulse to be reflected off the target object 32 and returned to a photodetector incorporated inside the laser range meter 2. With the speed of light known and an accurate measurement of the time made, the distance from the laser range meter 14 to the point on the surface of the target object 32 where the laser beam impinges can be calculated. Many pulses are fired sequentially while the local positioning system 2 is at a location and the average response is most commonly used.

The control station 24 comprises a computer system that is programmed with three-dimensional localization software that is used to process the range data received from the computer system 4 of the local positioning system 2. For example, the three-dimensional localization software may be of a type that uses multiple calibration points 5a-5c on the target object 32 (such as points or features on a surface on a wall of a storage tank) to define the location (position and orientation) of camera 12 relative to target object 32. The calibration points 5a-5c may be visible features of known position in the local coordinate system of the target object 32 as determined from a three-dimensional database of feature positions (e.g., a CAD model) or other measurement technique. During the process of calibrating the local positioning system 2, X,Y,Z data for at least three non-collinear points are extracted from the CAD model or other source of three-dimensional data. Typically calibration points 5a-5c are selected which correspond to features that can be easily located on the target object 32. The three-dimensional localization software utilizes the calibration points 5a-5c and the pan and tilt data from the pan-tilt mechanism 16 to define the relative position and orientation of the camera 12 with respect to the local coordinate system of the target object 32 (described in more detail below). The measured distances to the calibration points 5a-5c may be used in coordination with the pan and tilt angles from the pan-tilt mechanism 16 to solve for the camera position and orientation relative to the target object 32. Further details concerning a methodology for generating a camera pose transformation matrix reflecting the position and orientation of a camera relative to a coordinate system of a target object are given below.

Once the position and orientation of the camera 12 with respect to the target object 32 have been determined, the computer system 4 of the local positioning system 2 may be operated to rotate and zoom the optical image field of the camera 12 toward a point of interest of unknown coordinate position on the target object 32, which may be the location of an anomaly, for example. At this position of the aim direction vector 34, the orientation of the camera 12 (which may include the respective angles of the camera 12 along the pan and tilt axes) may be recorded. By using the pan and tilt angles from the pan-tilt mechanism 16 and the relative position and orientation (i.e., relative location) of the camera 12 determined in the calibration process, the computer system at the control station 24 may determine the location of the point of interest relative to the coordinate system of the target object 32. The anomaly on the target object 32 may be sized using known techniques. In the case of a crack, the length of the crack may be measured by computing a distance between two endpoints of the crack.

The reverse process, in which the position of a point of interest may be known in the target object's coordinate system (from a previous data acquisition session, a CAD model, or other measurement), can also be performed. In this situation, the camera 12 may be placed in any location on the work area (which may be in a different location than the location where the original data was recorded), where calibration points 5a-5c are visible and the instrument-to-target calibration step may be performed. This calibration is referred to herein as "the camera pose", but it is associated with more than just the camera; for example, it may also include instrumentation for measuring distance (such as a laser range meter). The direction vector from the point of interest to the camera 12 may be calculated in the target object's coordinate system. The inverse of the camera pose transformation matrix may be used to convert the direction vector into the coordinate system of the local positioning system 2. The pan and tilt angles may then be calculated and used by the pan-tilt mechanism 16 to aim the camera 12 at the point of interest on the target object 32.

In a typical implementation, the local positioning system 2 may be set up within a range of the target object 32 that does not result in problematic attenuation of the laser beam. The target object 32 may, for example, be a structure such as a storage tank wall that is submerged in a liquid. The calibration points 5a-5c on the target object 32 may be selected and used by the three-dimensional localization software in conjunction with the pan and tilt data (i.e., pan and tilt angles) from the pan-tilt mechanism 16 and distance data from the laser range meter 14 to determine the position and orientation of the camera 12 with respect to target object 32. The calibration points 5a-5c may be feature points of known position in the local coordinate system of the target object 32 as determined from a three-dimensional CAD model or other measurement technique.

The laser range meter 14 (also called a "laser range finder" or "laser distance meter") is affixed to the camera 12 to create a laser hybrid system. Measurement data from the laser range meter 14 can be used to obtain estimates of the respective distances from the laser range meter 14 (and from the camera 12 to which the laser range meter 14 is fixed) to calibration points on a target object 32. A typical laser range meter 14 comprises a laser diode which transmits a bundled, usually visible, laser beam toward a surface of a target object 32. The light which is backscattered and/or reflected by the target object 32 is imaged on the active surface of a photoreceiver by receiving optics. The laser diode has a position and an orientation which are fixed relative to the position and orientation of the camera 12; the photoreceiver has a position and an orientation which are fixed relative to the position and orientation of the laser diode. The time-of-flight between transmission and reception of the light can be used to calculate the distance between the laser range meter 14 and the portion of the target object surface on which the transmitted beam impinged. Alternatively, a distance meter which directionally projects wave energy other than a laser beam could be utilized.

For the sake of completeness, it may be noted that the foregoing methods for determining the three-dimensional coordinates of a point of interest on a target object relative to a frame of reference of the target object 32 using a local positioning system 2 have the following steps in common: (a) calibrating the pan-tilt mechanism 16 relative to the frame of reference; (b) controlling the pan-tilt mechanism 16 to cause the laser range meter 14 to aim at a point of interest on the target object 32; (c) measuring the pan and tilt angles of the pan-tilt mechanism 16 while the laser range meter 14 is aimed at the point of interest; (d) measuring the distance separating the laser range meter 14 and the point of interest; and (e) converting the distance and angle measurements into a Cartesian coordinate vector representing the location of the point of interest in the frame of reference of the target object 32.

In accordance with one embodiment of the method described in the preceding paragraph, step (a) comprises: aiming the laser range meter 14 at three or more calibration points 5a-5c on the target object 32 at different times while the support member 10 is stationary; and computing a calibration matrix representing a transformation from a frame of reference of the pan-tilt mechanism 16 to the frame of reference of the target object 32. In one proposed implementation, step (a) further comprises: measuring the pan and tilt angles of the pan-tilt mechanism 16 while the laser range meter 14 is aimed at each calibration point 5a-5c; and measuring the distances separating the laser range meter 14 and each calibration point 5a-5c while the laser range meter 14 is aimed at each calibration point 5a-5c. Thus for any point of interest on the target object 32, the computer system at the control station 24 may be configured with position computation software that enables determination of the three-dimensional coordinates of that point of interest in the coordinate frame of reference of the measurement system.

Figure 2A:
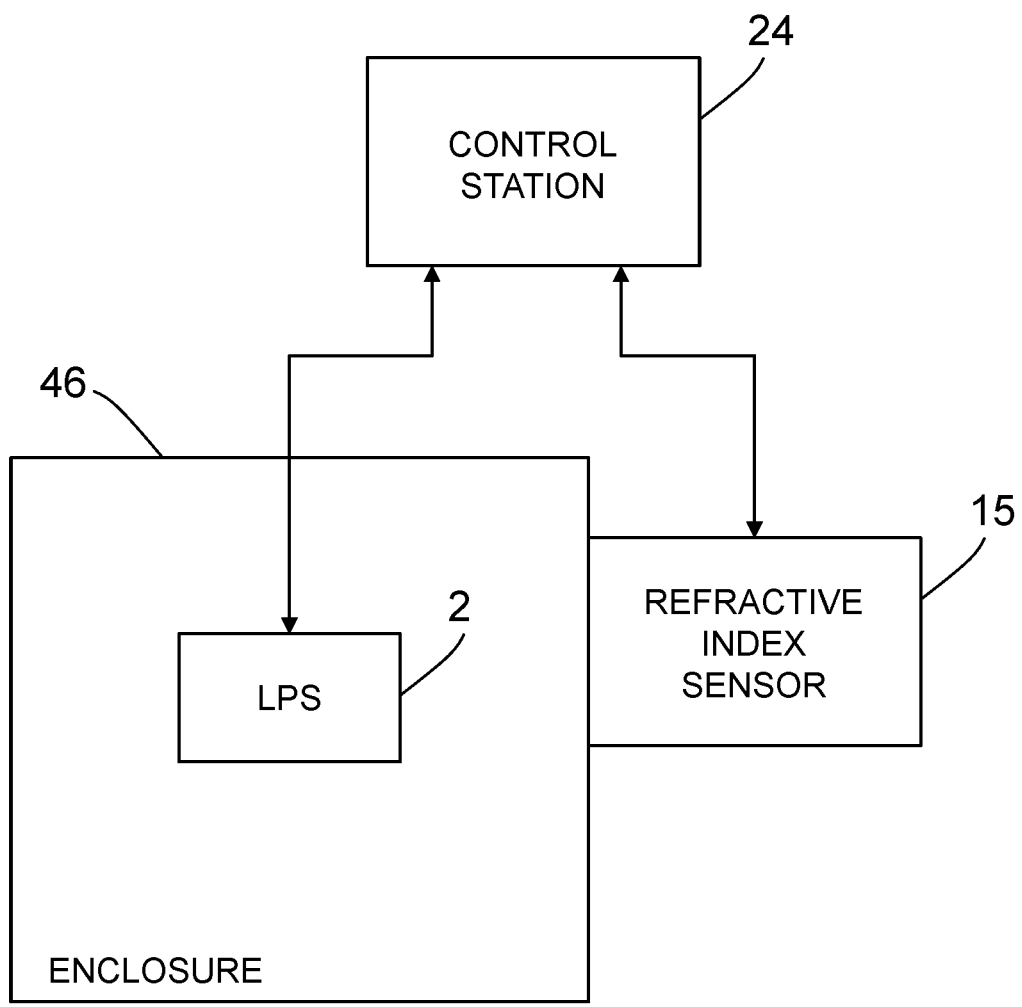
FIG. 2A is a block diagram identifying some components of a system for measuring a distance to a point on a submerged surface in accordance with one embodiment.

The local positioning system 2 depicted in FIGS. 1 and 2 may be incorporated in an automated apparatus that is designed to operate while submerged in a liquid, for example, while underwater. FIG. 2A is a block diagram identifying some components of a system for measuring a distance to a point on a submerged surface in accordance with one embodiment. The system includes a local positioning system 2 rotatably mounted inside an optically transparent enclosure 46 and a refractive index sensor 15 fixedly mounted to the outside of the optically transparent enclosure 46. Both the local positioning system 2 and refractive index sensor 15 have respective computers or processors for activating a light source and conditioning electrical signals from an optical-electrical device such as a photodetector or a charge-coupled device. When the system is submerged in a body of liquid, the computers or processors of the local positioning system 2 and of the refractive index sensor 15 communicate with the computer system located at the ground-based control station 24. The local positioning system 2 receives control signals for activating a laser and returns data signals representing raw distance (i.e., range) data acquired by a photodetector; the refractive index sensor receives control signals for activating a light source and returns data signals representing index of refraction data acquired by an image sensor.

A refractive index sensor (a.k.a. refractometer) is a device which is configured to measure an index of refraction. The index of refraction is typically calculated using Snell's law. In accordance with one proposed implementation, the refractive index sensor 15 is configured to measure the refractive index of the liquid in which it is immersed based on a determination of the critical angle of total reflection. A light-emitting diode (LED) is focused under a wide range of angles onto a prism surface which is in contact with the liquid by means of a lens system. Unlike a laser, the color of light emitted from an LED is not coherent. Depending on the refractive index of the liquid, the incoming light below the critical angle of total reflection is partly transmitted into the liquid, whereas for higher angles of incidence the light is totally reflected. This dependence of the reflected light intensity on angle of incidence is measured with a high-resolution sensor array, e.g., a charge-coupled device (CCD) image sensor. From the video signal taken with the CCD image sensor, the refractive index of the liquid can be calculated. This determination of the refraction angle is unaffected by vibrations and other environmental disturbances.

The computer system at the control station 24 is configured to calculate the speed of light in the liquid based on the index of refraction data received from the refractive index sensor 15 and then compute a corrected value for the actual distance to the target object using the raw distance data from the local positioning system 2 and the results of the speed of light calculation, along with data representing the dimensions of the optically transparent enclosure. Data representing the geometry of the optically transparent enclosure 46, such as thickness and distance from the laser range meter of the local positioning system 2, may be retrieved from a database containing data representing a three-dimensional solid model of the optically transparent enclosure 46.

Various embodiments of systems for measuring distances to points on a surface of a target object submerged in water and acquiring three-dimensional coordinates for those points using a remotely operated submersible platform will now be described with reference to FIGS. 3A, 3B, 4-9, 10A, 10B, 11 and 12. The disclosed measurement systems use an on-board local positioning system 2 to acquire data and then use computer processing techniques to provide discrete or continuous measurements of three-dimensional coordinates of points on the submerged target object.

Figure 3A:
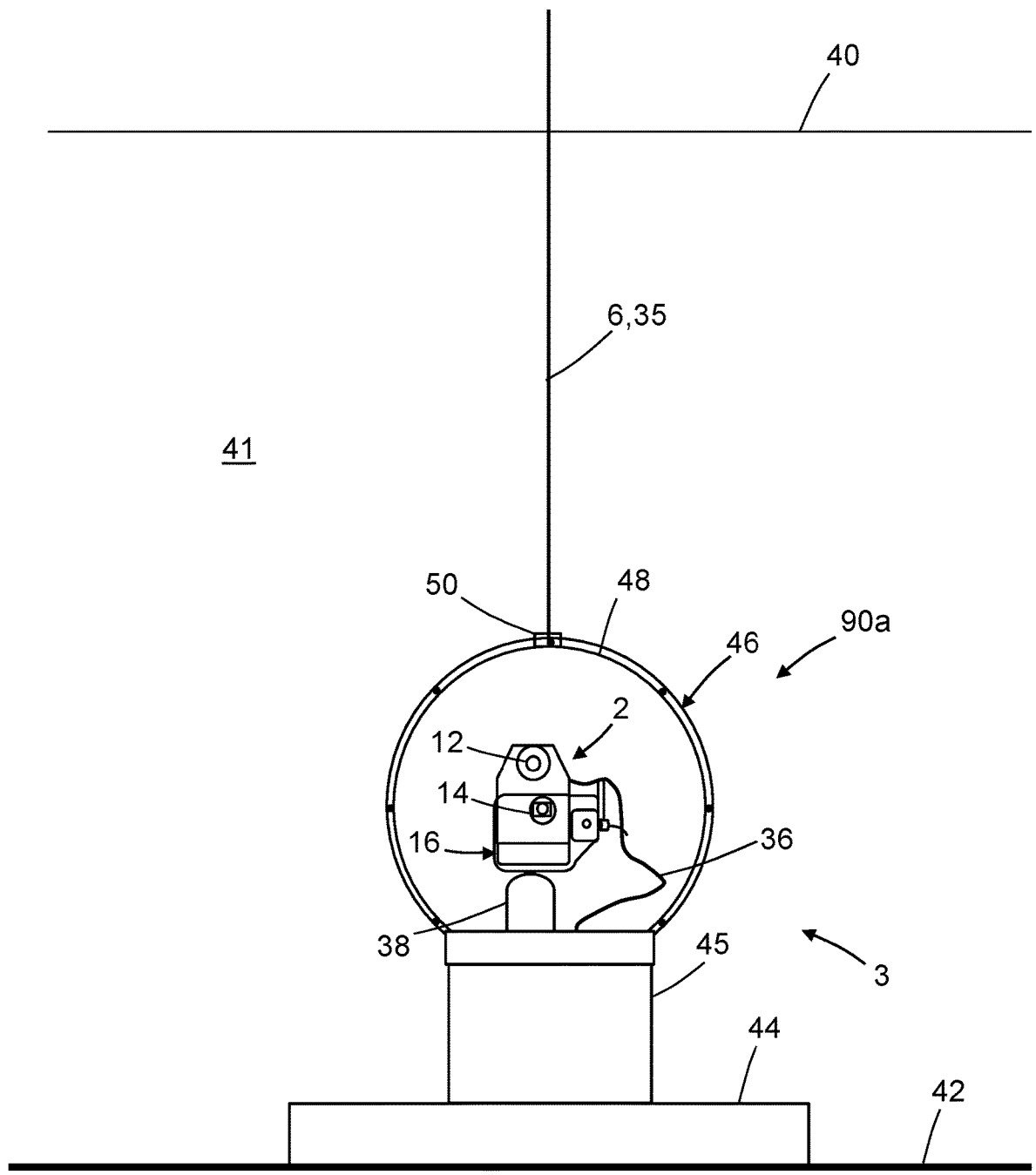
FIGS. 3A and 3B are diagrams representing front and side views of a submerged cable-suspended automated apparatus for measuring three-dimensional coordinates of points on a submerged surface of a target object in accordance with a first embodiment.
Figure 3B:
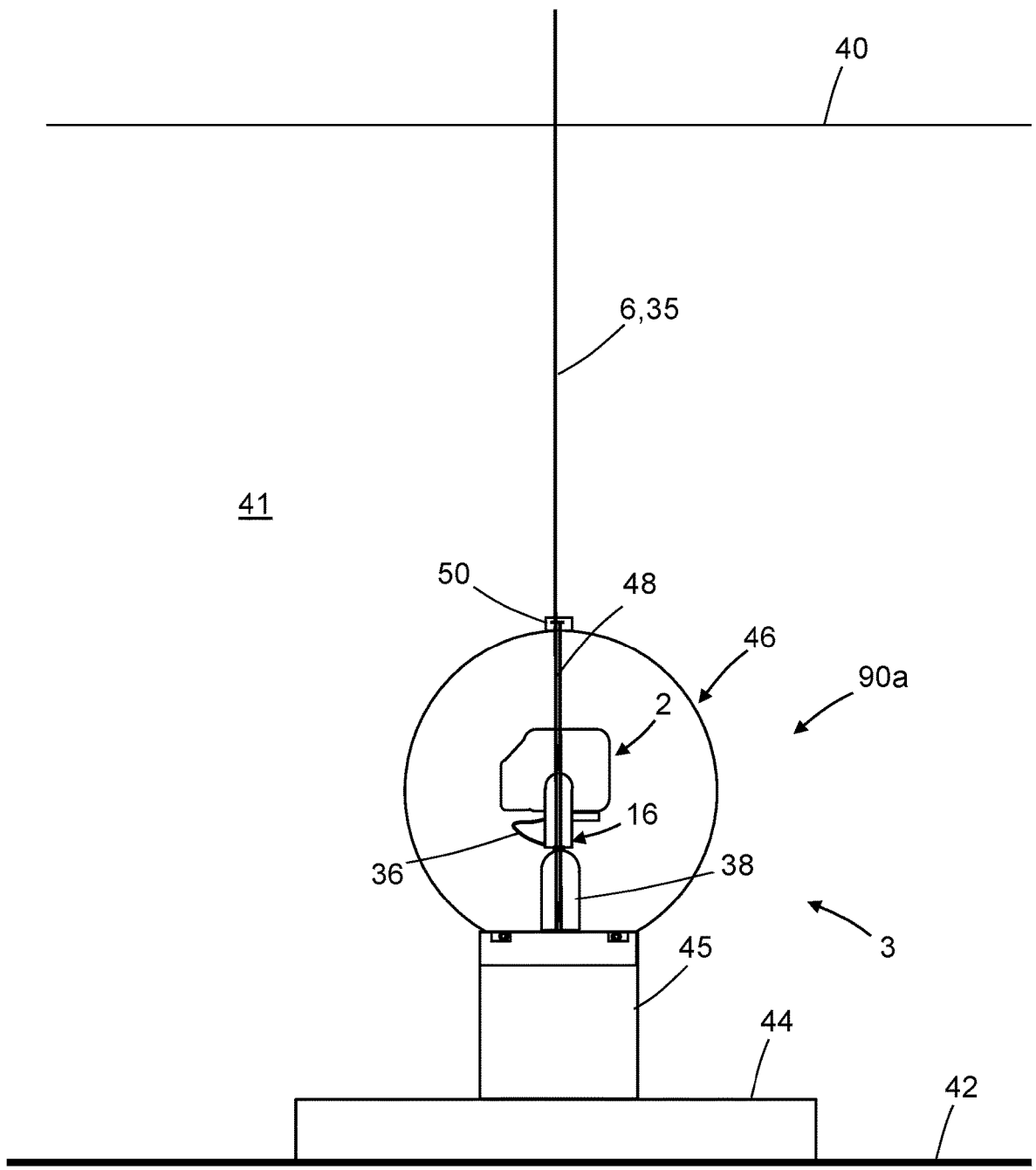

FIGS. 3A and 3B are diagrams representing front and side views of a fully submerged automated apparatus 90a, suspended from a tether cable 6, for measuring three-dimensional coordinates of points on the submerged surfaces of target objects in accordance with a first embodiment. This automated apparatus 90a includes a platform in the form of a base 44 and a liquid-tight pressure vessel 3 fixedly coupled to the base 44. The liquid-tight pressure vessel 3 is formed in part by a stand 45 seated on the base 44 and in part by an optically transparent enclosure 46 that is seated on and sealed to the stand 45. The space inside the liquid-tight pressure vessel 3 is filled with air; the space outside and immediately surrounding the liquid-tight pressure vessel 3 is occupied by a liquid, such as water. In the scenario depicted in FIGS. 3A and 3B, the automated apparatus 90a has been immersed in a body of water 41 having a waterline 40 and placed on a floor 42 underneath the body of water 41.

In accordance with one proposed implementation, the optically transparent enclosure 46 is in the shape of a section of a sphere. More specifically, the optically transparent enclosure 46 may be formed by respective sections of two flanged hemispheres, the flanges of the two hemispherical sections being fastened together to form an attachment ring 48. The optically transparent enclosure 46 may be made of glass or plastic. The optically transparent enclosure 46 is sealed to the stand 45 along a circular boundary to form the liquid-tight pressure vessel 3. A cable holder 50 is attached to the attachment ring 48 at the top of optically transparent enclosure 46. The distal end of the tether cable 6 is attached or tied to the cable holder 50 for raising and lowering the entire apparatus into and out of the body of water 41.

The submerged automated apparatus depicted in FIGS. 3A and 3B further includes a pedestal 38 projecting vertically upward from the stand 45 into the optically transparent enclosure 46 and a local positioning system 2 having some components mounted on pedestal 38 and other components housed inside stand 45. As previously mentioned, the local positioning system 2 includes a camera 12, a laser range meter 14 and a pan-tilt mechanism 16 disposed inside the liquid-tight pressure vessel 3. The pan-tilt mechanism 16 is mounted on top of the pedestal 38. In accordance with one proposed implementation, the pan-tilt mechanism 16 has a pan axis and a tilt axis that intersect at a point located at the center of the spherical section of the optically transparent enclosure 46. The local positioning system 2 further includes a computer system 4 (see FIG. 2) housed inside stand 45 and configured for controlling operation of camera 12, laser range meter 14 and pan-tilt mechanism 16.

The submerged automated apparatus depicted in FIGS. 3A and 3B may further include an electrical system that receives power and control signals via a first power/signal cord 35 incorporated inside or attached to the outside of the tether cable 6. This first power power/signal cord 35 (not shown separately in FIGS. 3A and 3B) continues beyond the cable holder 50 and follows the attachment ring 48 around the optically transparent enclosure 46 to a junction inside stand 45 where the first power/signal cord 35 is electrically coupled to the electrical system. The computer system 4 of the local positioning system 2 receives electrical power from a power source (not shown) via the first power/signal cord 35 and receives control signals from the control station 24 (see FIG. 2) via the first power/signal cord 35. Likewise an electrical power distribution and regulation system disposed inside stand 45 receives electrical power from the first power/signal cord 35a and then regulates and distributes that electrical power to the camera 12, laser range meter 14 and pan-tilt mechanism 16 via a second power/signal cord 36 disposed inside the optically transparent enclosure 46. Likewise the camera 12, laser range meter 14 and pan-tilt mechanism 16 of the local positioning system 2 receive control signals from the computer system 4 via the second power/signal cord 36.

In accordance with one proposed implementation, the optically transparent enclosure 46 is made of glass and the laser range meter 14 is configured so that the laser beam emitted by the automated apparatus 90a will travel along a radial line that is projected from the center of the spherical section of the optically transparent enclosure 46 to the internal air/glass interface of optically transparent enclosure 46. Because the optically transparent enclosure 46 is spherical (or more precisely, because the internal and external surfaces of the optically transparent enclosure 46 are concentric spherical sections), the emitted laser beam will propagate through the air inside the optically transparent enclosure 46 and impinge on the internal surface of the optically transparent enclosure 46 with an angle of incidence that is perpendicular to the tangent of that internal surface at the point of impingement. Thus no change in angle due to refraction will occur at the air/glass interface and the emitted beam will continue to propagate along the radial line through the glass until it impinges on the external surface of the optically transparent enclosure 46 with an angle of incidence that is perpendicular to the tangent of that external surface at the point of impingement. Again no refraction will occur at the glass/water interface and the emitted beam will continue to propagate along the radial line until it reaches the surface of the target object. At least some of the laser light reflected or scattered from the surface of the target object will return to the laser range meter 14 along the same radial line. Thus the laser range meter 14 can be used to measure distances in the manner previously described with reference to FIGS. 1 and 2 without the need for correction due to the effects of refraction at the interfaces of the optically transparent enclosure 46.

Figure 4:
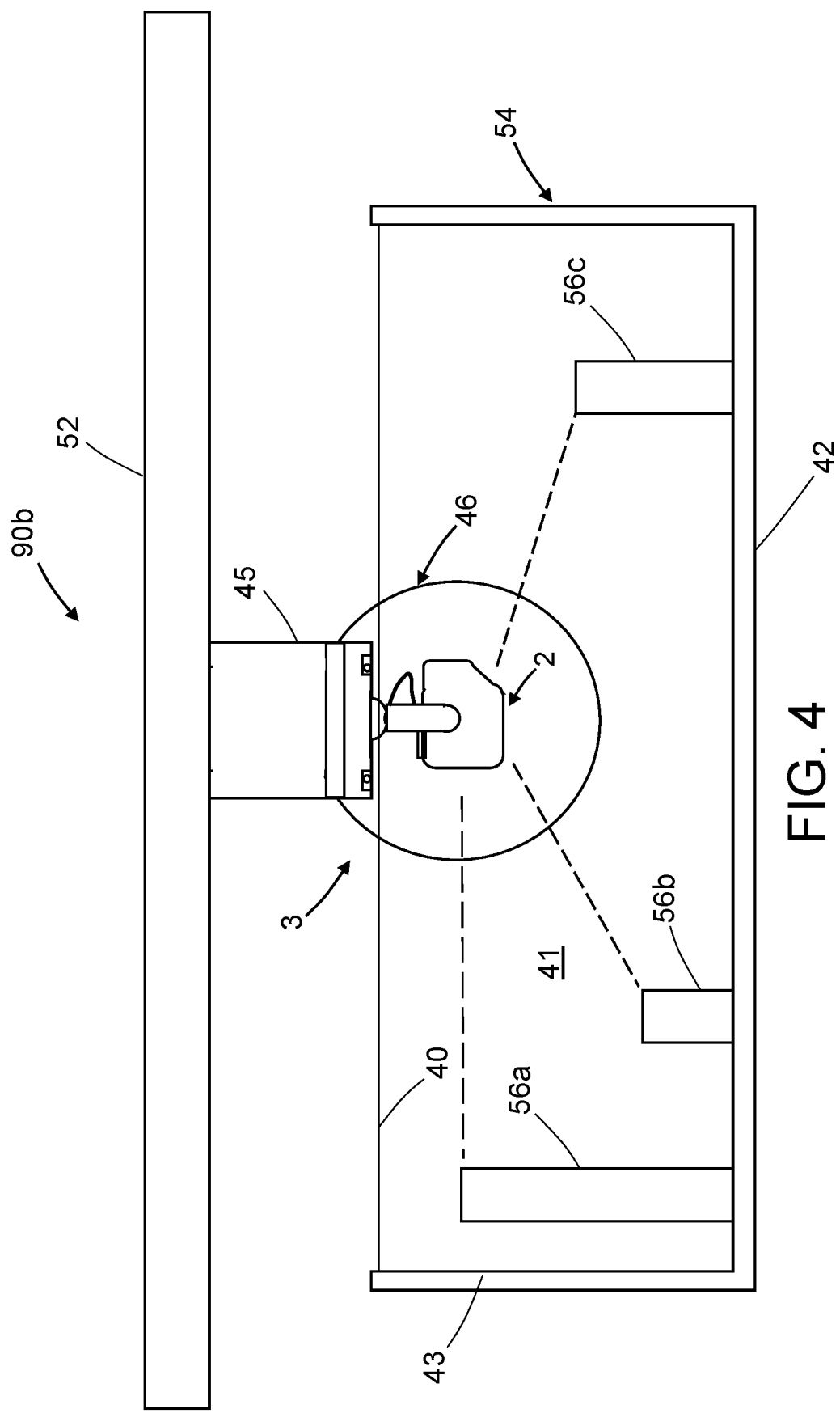
FIG. 4 is a diagram representing a view of an automated apparatus for measuring three-dimensional coordinates of points on a submerged surface of a target object in accordance with a second embodiment.

FIG. 4 is a diagram representing a view of an automated apparatus 90b for measuring three-dimensional coordinates of points on surfaces of submerged target objects 56a-56c in a tank 54 in accordance with a second embodiment. Instead of being mounted to a base that sits on the floor 42 of the tank 54, the liquid-tight pressure vessel 3 is supported from above by a support element 52, which may be movable horizontally and vertically in any one of a number of well-known ways. Alternatively, the liquid-tight pressure vessel 3 may be laterally movable along a support element 52 which is longitudinally and vertically movable relative to the tank 54. As seen in FIG. 4, the liquid-tight pressure vessel 3 may be only partially submerged provided that the laser beam emitted by the laser range meter 14 is under the waterline 40.

Figure 5:
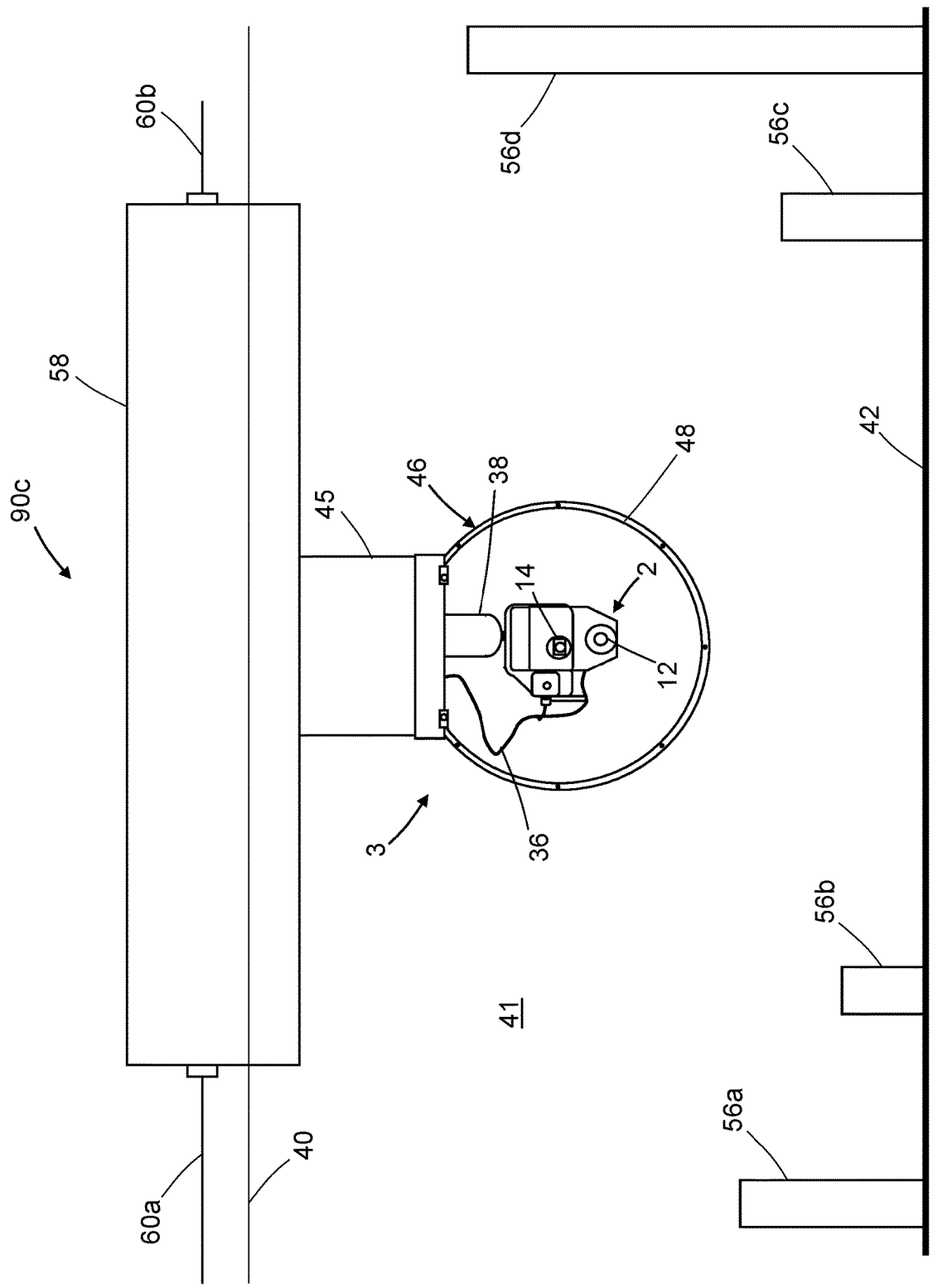
FIG. 5 is a diagram representing a front view of an automated apparatus for measuring three-dimensional coordinates of points on the surfaces of submerged target objects, the automated apparatus being supported by a floating platform stabilized by tow cables in accordance with a third embodiment.

FIG. 5 is a diagram representing a front view of an automated apparatus 90c for measuring three-dimensional coordinates of points on surfaces of underwater objects 56a-56d in accordance with a third embodiment. In this embodiment, the liquid-tight pressure vessel 3 is supported from above by a floating platform 58 that is movable horizontally by means of tow cables 60a and 60b. Other tow cables are not shown in FIG. 5.

Figure 6:
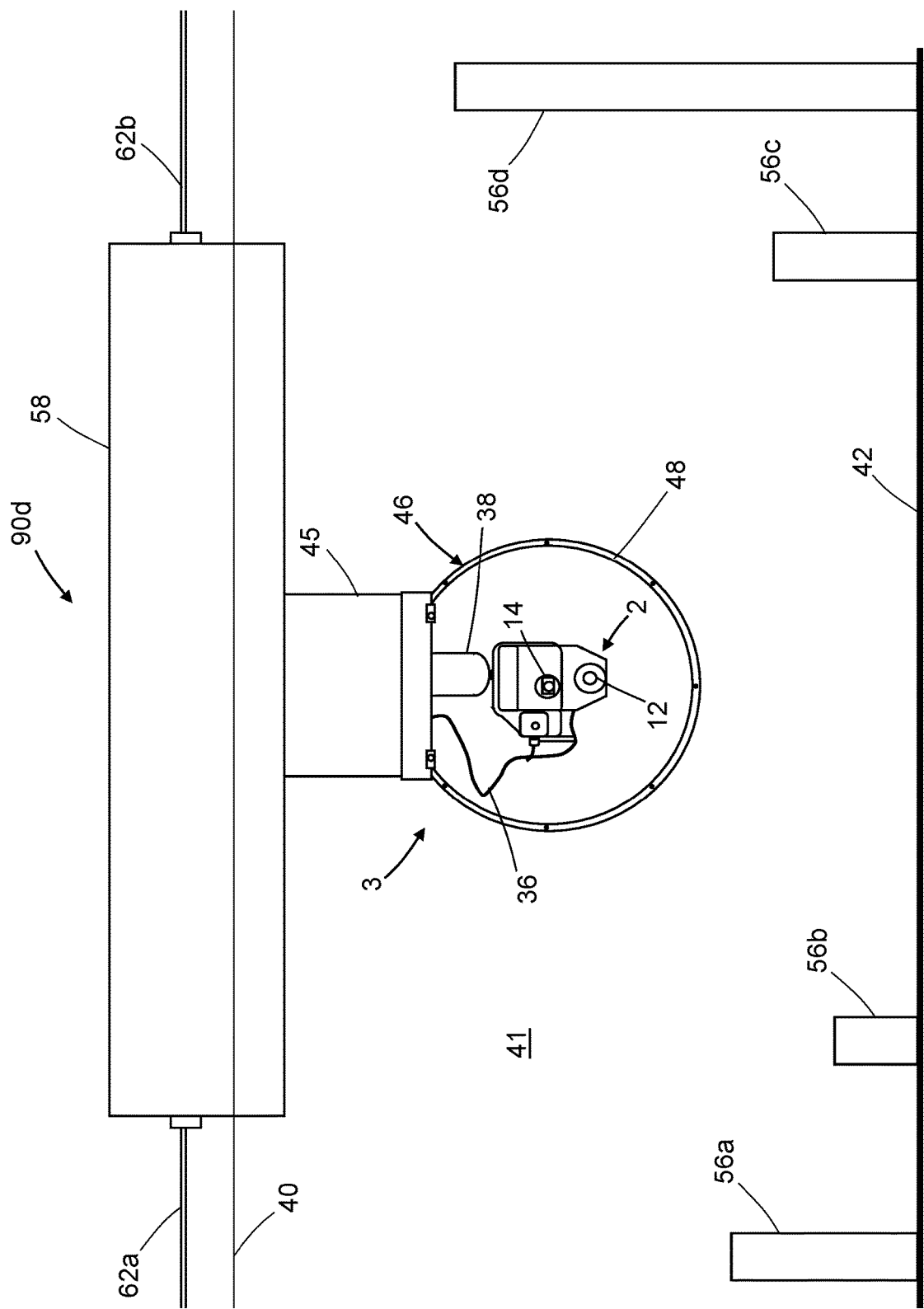
FIG. 6 is a diagram representing a front view of an automated apparatus for measuring three-dimensional coordinates of points on a submerged surface of a target object, the automated apparatus being supported by a floating platform stabilized by poles in accordance with a fourth embodiment.

FIG. 6 is a diagram representing a front view of an automated apparatus 90d for measuring three-dimensional coordinates of points on surfaces of underwater objects 56a-56d in accordance with a fourth embodiment. In this embodiment, the liquid-tight pressure vessel 3 is supported from above by a floating platform 58 that is movable horizontally by means of positioning poles 62a and 62b. Other positioning poles are not shown in FIG. 6.

Figure 7:
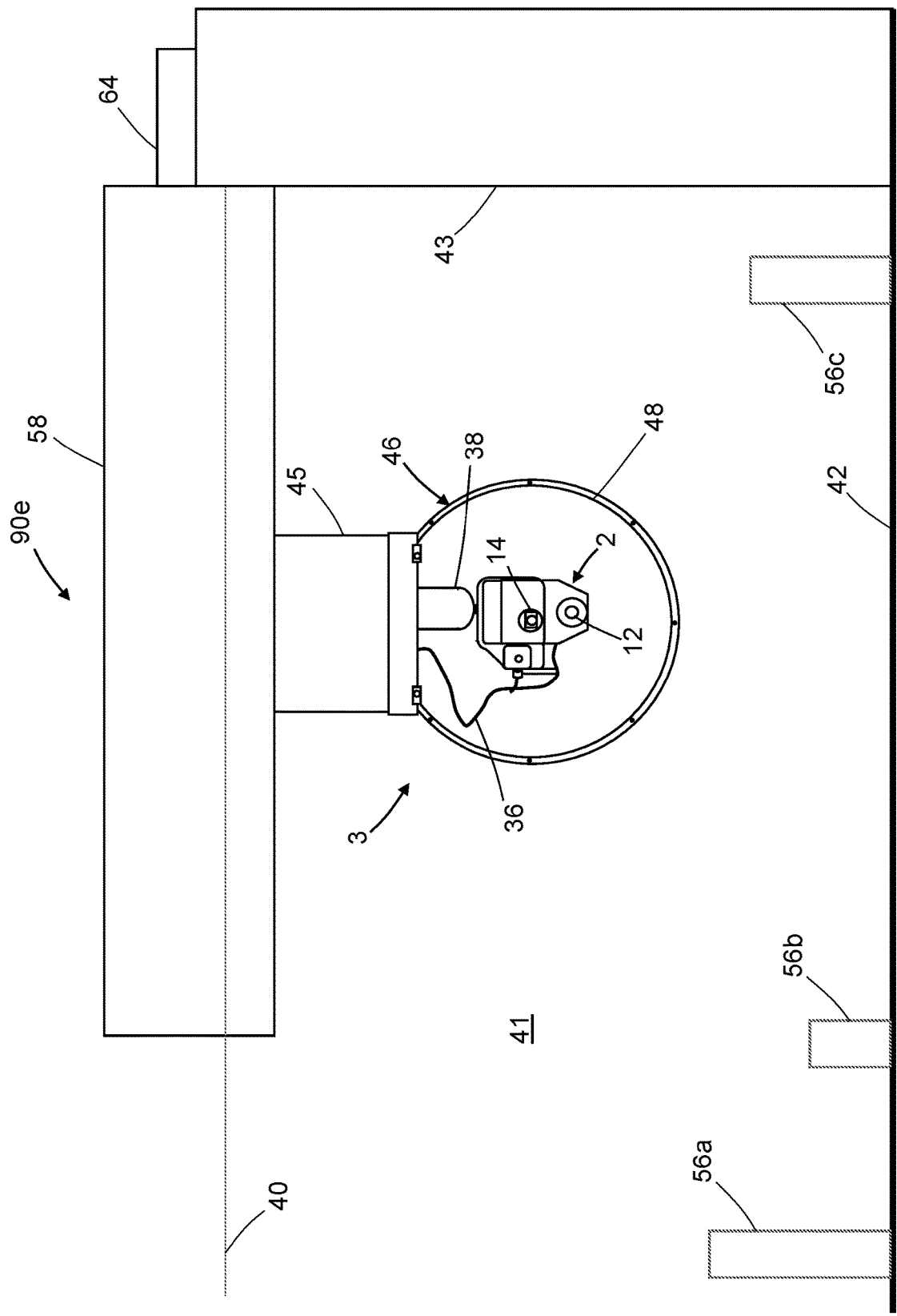
FIG. 7 is a diagram representing a front view of an automated apparatus for measuring three-dimensional coordinates of points on a submerged surface of a target object, the automated apparatus being supported by a floating platform stabilized by a tank wall in accordance with a fifth embodiment.

FIG. 7 is a diagram representing a front view of an automated apparatus 90e for measuring three-dimensional coordinates of points on surfaces of underwater objects 56a-56c submerged in a body of water 41 in a tank having a tank wall 43 in accordance with a fifth embodiment. In this embodiment, the liquid-tight pressure vessel 3 is supported from above by a floating platform 58 that is stabilized by means of a wall support 64 that is attached or anchored to the top of the tank wall 43.

Figure 8:
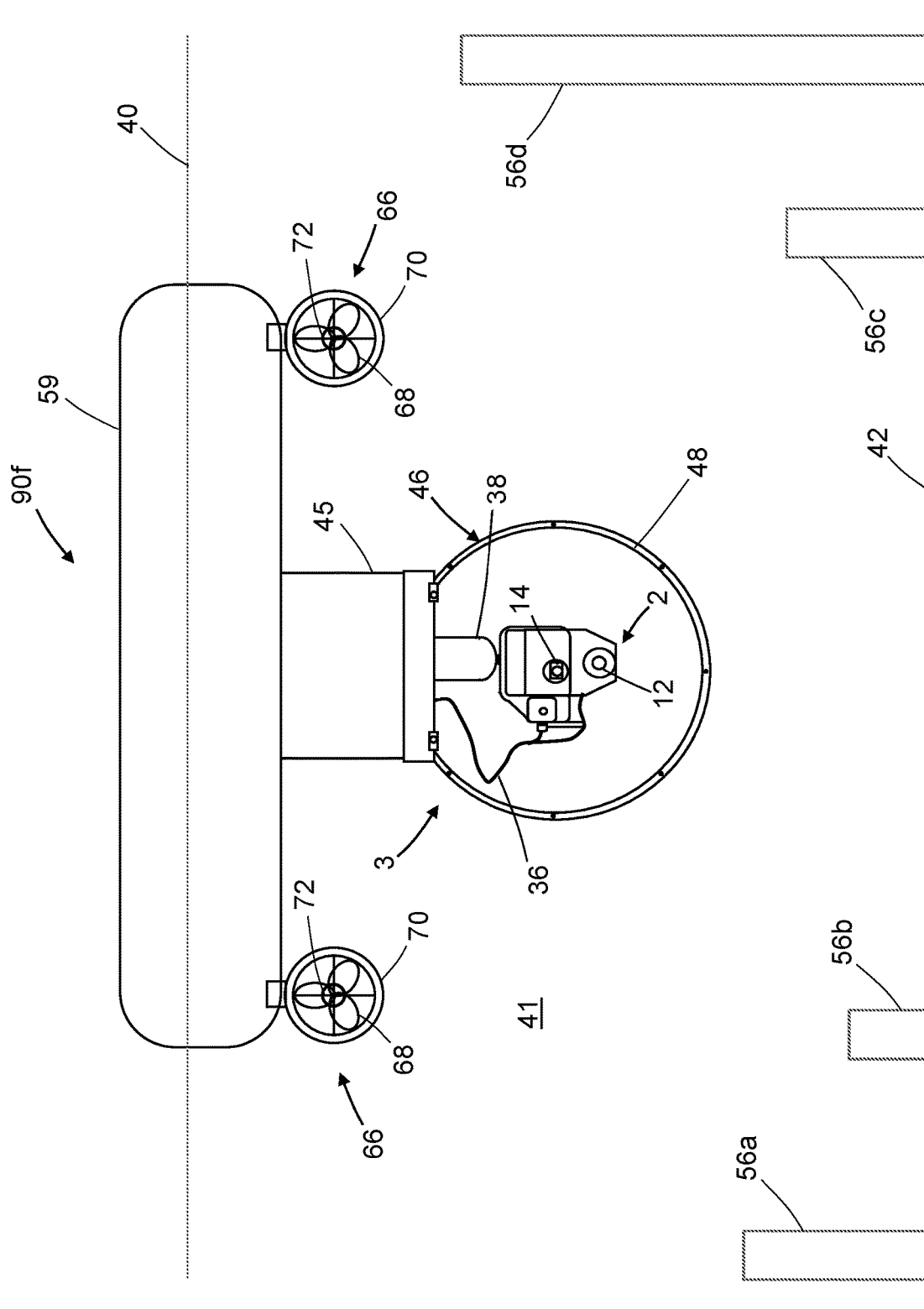
FIG. 8 is a diagram representing a front view of an automated apparatus for measuring three-dimensional coordinates of points on a submerged surface of a target object, the automated apparatus being supported by a floating platform with thrusters in accordance with a sixth embodiment.

FIG. 8 is a diagram representing a front view of a self-propelled automated apparatus 90f for measuring three-dimensional coordinates of points on surfaces of underwater objects 56a-56d in accordance with a sixth embodiment. In this embodiment, the liquid-tight pressure vessel 3 is supported from above by a self-contained floating platform 59 equipped with a multiplicity of thrusters 66, only two of which are visible in FIG. 8. In accordance with one proposed implementation, each thruster 66 is in the form of a ducted propeller unit that includes a propeller 68, a nozzle 70 that surrounds the propeller 68, a propeller thrust motor 72 (supported by the nozzle 70) having an output shaft coupled to the propeller 68 for driving it to rotate to generate thrust, and a propeller yaw control motor (not shown) that drives rotation of the thruster 66 about a yaw axis. The thrusters 66 can rotate independently about the yaw (i.e., vertical) axis for motion control (e.g., steering). The yaw angle, which is independently controllable for each thruster 66, determines the direction of the thrust produced by each thruster 66. Each thruster 66 has independent thrust and yaw control. The steering of this self-contained floating platform 59 works the same as a swerve drive for ground vehicles (except with ducted propellers instead of wheels, rotated 90 degrees).

Figure 9:
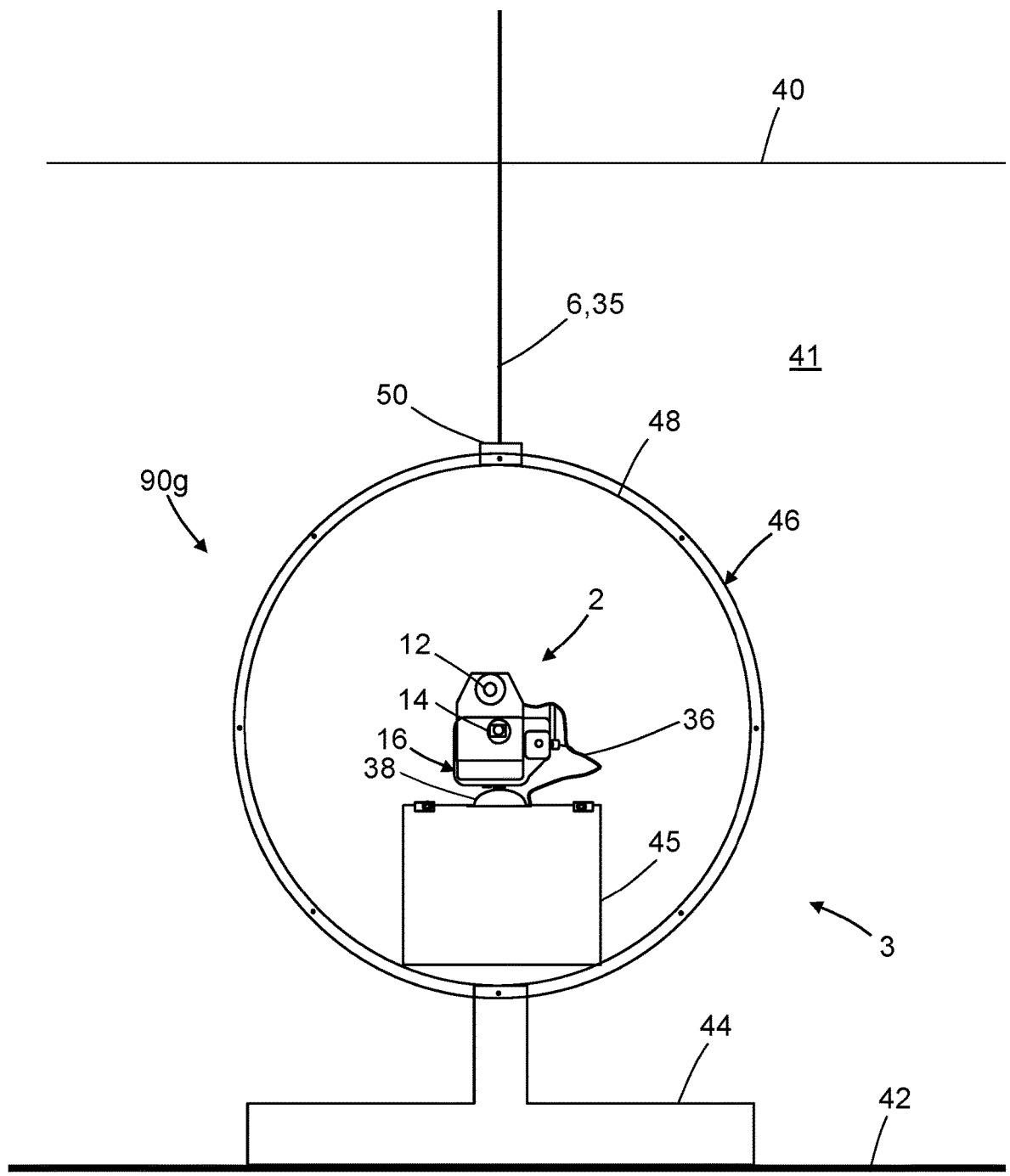
FIG. 9 is a diagram representing a front view of an automated apparatus for measuring three-dimensional coordinates of points on a submerged surface of a target object in accordance with a seventh embodiment.

FIG. 9 is a diagram representing a front view of a cable-suspended automated apparatus 90g for measuring three-dimensional coordinates of points on a submerged surface of a target object in accordance with a seventh embodiment. This seventh embodiment is similar to the first embodiment, except that the optically transparent enclosure 46 is a full sphere and the stand 45 is disposed inside the optically transparent enclosure 46.

Figure 10A:
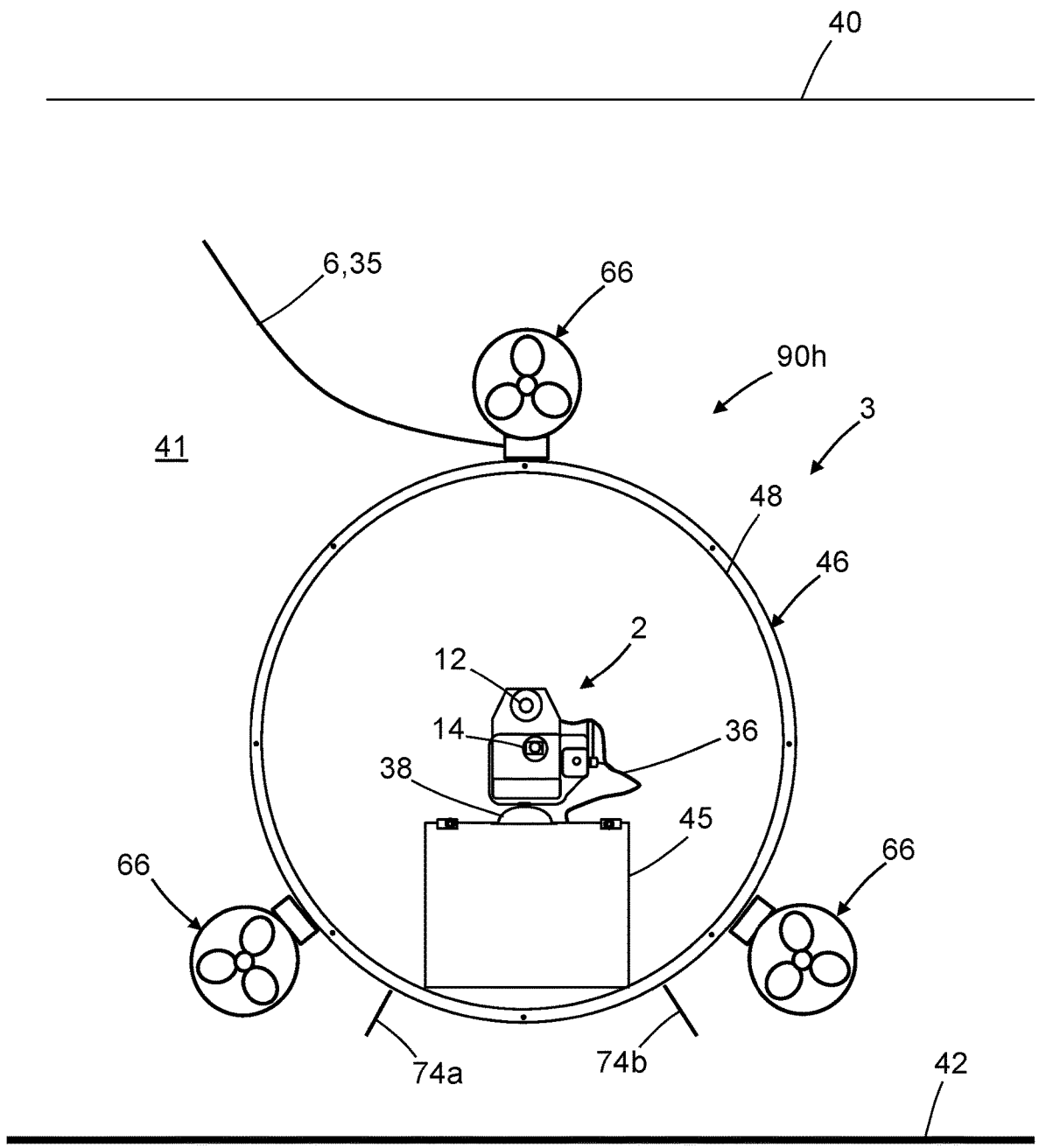
FIGS. 10A and 10B are diagrams representing front and side views of a self-propelled automated apparatus for measuring three-dimensional coordinates of points on a submerged surface of a target object in accordance with an eighth embodiment.
Figure 10B:
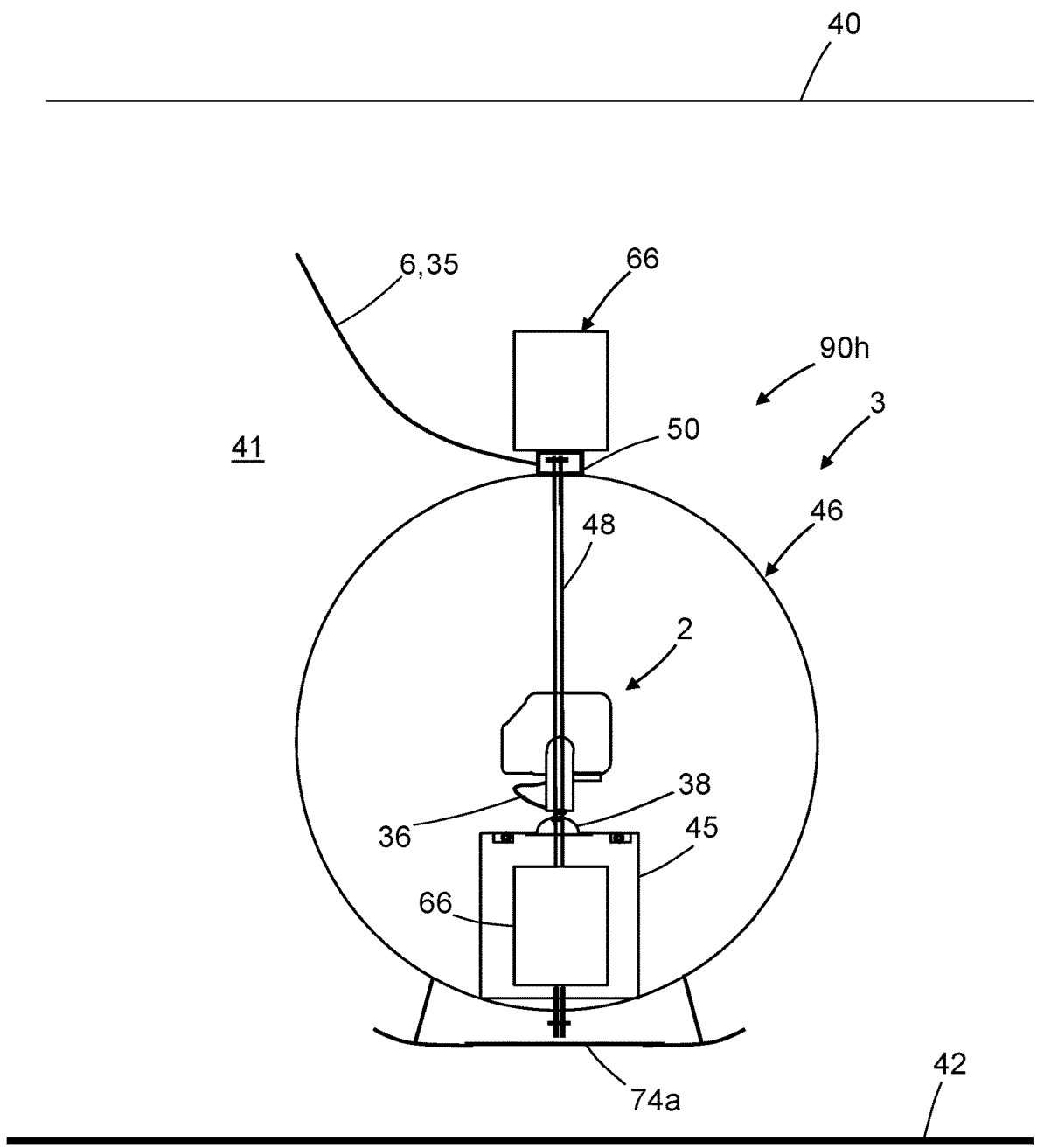

FIGS. 10A and 10B are diagrams representing front and side views of a submerged self-propelled automated apparatus 90h for measuring three-dimensional coordinates of points on a submerged surface of a target object in accordance with an eighth embodiment. In this embodiment, again the stand 45 is disposed inside and a multiplicity of thrusters 66 are mounted on the outside of a spherical optically transparent enclosure 46. The thrusters 66 may be ducted propeller units of the type previously described with reference to FIG. 8. The movement of the self-propelled automated apparatus 90h may be controlled by an operator situated at the control station 24 (see FIG. 2). The operator may send control signals to motor controllers (not shown in FIGS. 10A and 10B) that control the aforementioned propeller thrust and propeller yaw control motors. In addition, the self-propelled automated apparatus 90h may be equipped with a ballast tank and a pump for selectively removing water from or injecting water into the ballast tank (not shown in FIGS. 10A and 10B). Thus the operator is able to pilot the automated apparatus 90h to a desired location above the floor 42 and then cause the automated apparatus 90h to descend until its landing rails 75a and 75b rest on the floor 42.

Figure 11:
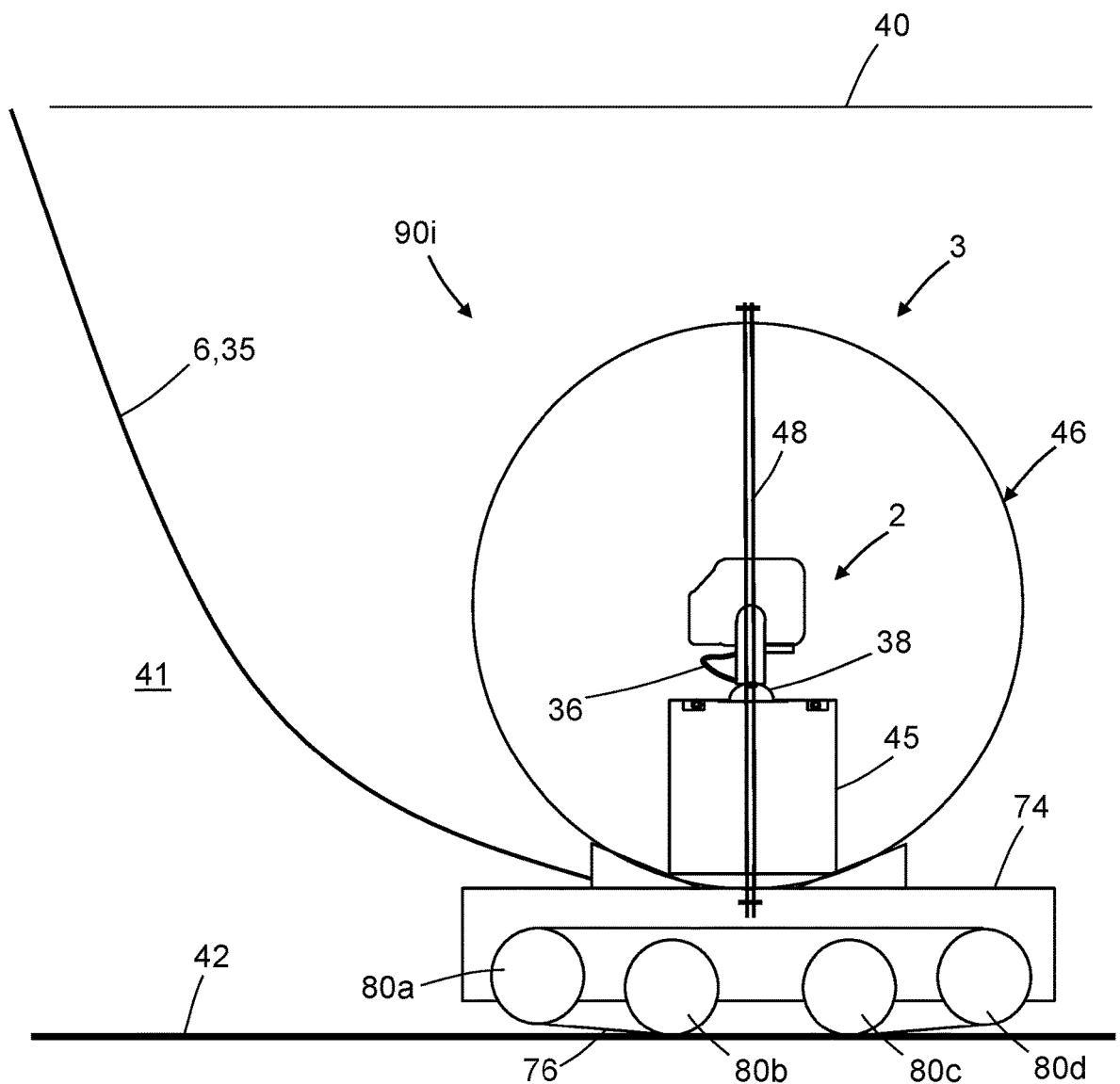
FIG. 11 is a diagram representing a side view of an automated apparatus in the form of a crawler vehicle for measuring three-dimensional coordinates of points on a submerged surface of a target object in accordance with a ninth embodiment.

FIG. 11 is a diagram representing a side view of a submerged automated apparatus 90i in the form of a bottom crawler vehicle for measuring three-dimensional coordinates of points on a submerged surface of a target object in accordance with a ninth embodiment. This bottom crawler vehicle is designed to travel on the floor 42 while the automated apparatus 90i is fully submerged in the body of water 41. The bottom crawler vehicle includes a frame 74, a respective set of wheels 80a-80d rotatably coupled to opposite sides of the frame 74 and a respective endless track 76 that circulates around the set of wheels 80a-80d as the wheels rotate. At least one of the wheels 80a-80d on each side of the frame 74 is driven to rotate by a motor that is subject to control by the operator at the control station 24 (see FIG. 2). For example, if the wheels on opposite sides of frame 74 are driven to rotate in the same direction and at the same speed, the bottom crawler vehicle will travel in a straight line, whereas if the wheels on opposite sides of frame 74 are driven to rotate in the opposite directions and at the same speed, the crawler vehicle will rotate in place.

In accordance with variations of the ninth embodiment depicted in FIG. 11, the bottom crawler vehicle may be configured to move holonomically. For example, a holonomic-motion crawler vehicle may be configured with four Mecanum wheels, each Mecanum wheel having a multiplicity of tapered rollers rotatably mounted to its circumference and freely rotatable about its axis. These tapered rollers have an axis of rotation which lies at a 45° angle with respect to the plane of the Mecanum wheel. Type "A" Mecanum wheels have left-handed rollers, while Type "B" Mecanum wheels have right-handed rollers. The holonomic-motion crawler vehicle can be made to move in any direction and turn by varying the speed and direction of rotation of each Mecanum wheel. For example, rotating all four Mecanum wheels in the same direction at the same rate causes forward or backward movement; rotating the Mecanum wheels on one side of the frame at the same rate but in the opposite direction of the rotation by the Mecanum wheels on the other side causes the crawler vehicle to rotate; and rotating the Type "A" wheels at the same rate but in the opposite direction of the rotation of the Type "B" wheels causes sideways movement.

Figure 12:
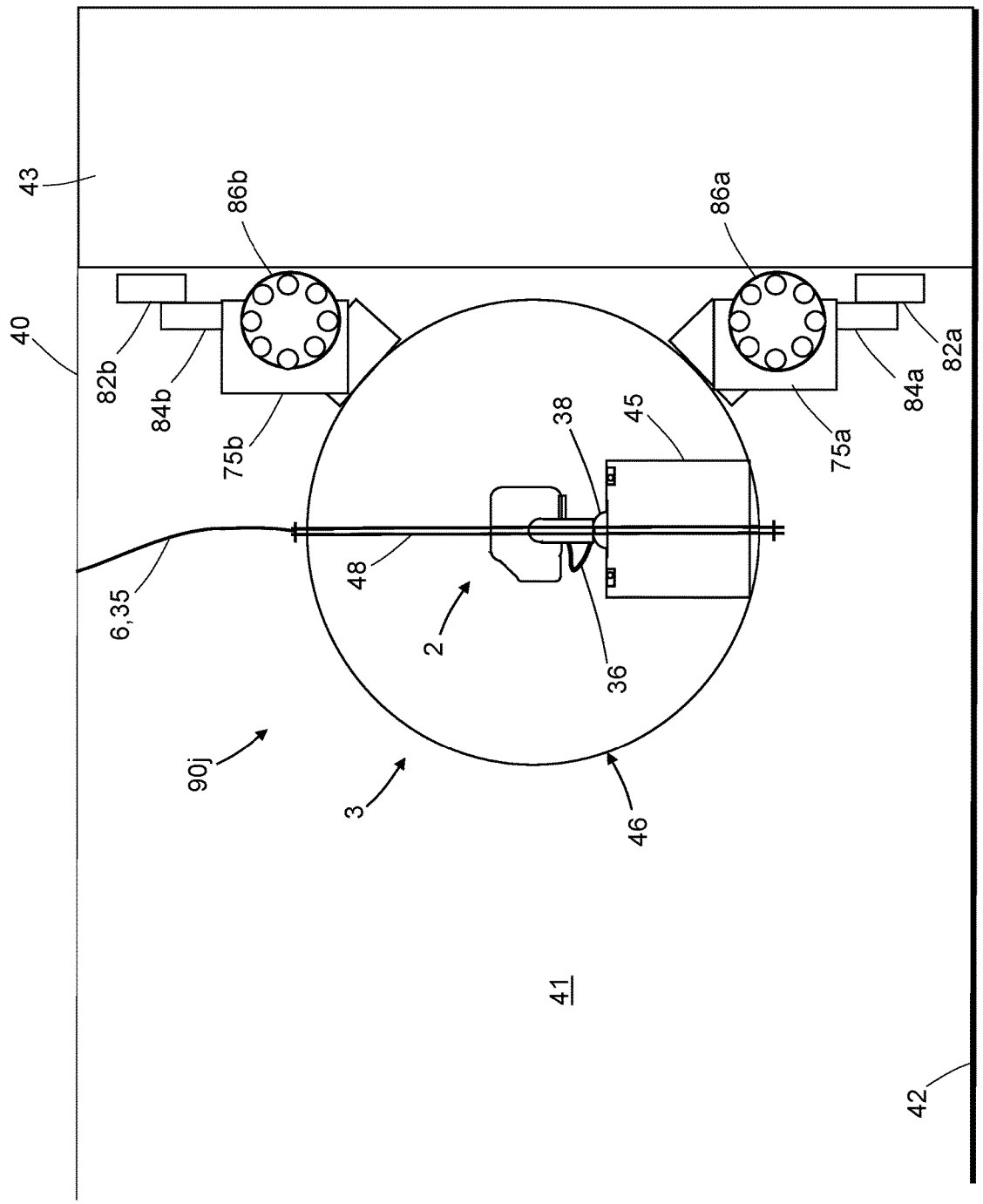
FIG. 12 is a diagram representing a side view of an automated apparatus in the form of a holonomic-motion crawler vehicle which is magnetically attached to a tank wall in accordance with a tenth embodiment.

In accordance with alternative embodiments, a crawler vehicle can be designed to also crawl along a vertical surface, such as the surface of a tank wall 43. FIG. 12 is a diagram representing a side view of a submerged automated apparatus 90j in the form of a holonomic-motion crawler vehicle equipped with four Mecanum wheels. Only Mecanum wheels 86a and 86b are visible in FIG. 12. Mecanum wheel 86a is rotatably mounted to a forward chassis 74a; Mecanum wheel 86b is rotatably mounted to an aft chassis 74b. The forward and aft chasses 74a and 74b are attached to the outside of a spherical optical transparent enclosure 46 in a configuration that allows the local positioning system 2 to emit laser beams that pass through an unobstructed portion of the optical transparent enclosure 46 and impinge on the surface of the tank wall 43, which in this example is made of ferromagnetic material. To enable the automated apparatus 90j to couple to and move along the surface of the tank wall 43, a first electro-permanent magnet 82a is fixedly coupled to the forward chassis 74a by means of a magnet support element 84a, while a second electro-permanent magnet 82b is fixedly coupled to the aft chassis 74b by means of a magnet support element 84b. Attraction forces can be produced by turning on the electro-permanent magnets 82a and 82b. Each electro-permanent magnet includes a permanent magnet having North and South poles and a reversible electromagnet. The electro-permanent magnet will be respectively magnetically coupled to the ferromagnetic material of the tank wall 43.

Electro-permanent magnets are solid-state devices that have zero static power consumption (like permanent magnets), but can be switched on and off like electromagnets. The power only needs to be applied for a brief moment to toggle the state to either on or off, which makes it more useful for applications where overall power usage is preferably low. The use of electro-permanent magnets also has the benefit that, if power is lost, the coupling is still active. The electro-permanent magnets 82a and 82b may receive electrical power from a remote electrical power source via the power/signal cord 35 (with back-up power being available from a battery carried by the crawler vehicle), but it would only need to be energized for a brief interval to switch the magnetic field state.

To enable crawler vehicle movement on the vertical surface of tank wall 43, the electro-permanent magnets may be configured to selectively produce attraction forces that generate sufficient traction to hold the crawler vehicle at a desired elevation despite the force of gravity or buoyancy being exerted on the crawler vehicle. Those attraction forces may be increased to facilitate upward movement of the crawler vehicle (by giving the Mecanum wheels 86a and 86b more traction) in response to the propulsive forces produced when the Mecanum wheels 86a and 86b are driven to rotate in a clockwise direction (as viewed in FIG. 12).

The range of the local positioning system is reduced by the attenuation which occurs during propagation of laser beams through water or other liquid. To address the short-range issue underwater, a process for acquiring measurement data over a wider range has been developed. This is a stepping stone type of process involving acquisition of three-dimensional measurement data for three or more non-collinear points in part of the current measurement region, moving the measurement instrument, and taking new measurements of those same points. This type of approach will allow measurement in two or more adjacent regions using the same coordinate system reference system.

Figure 13:
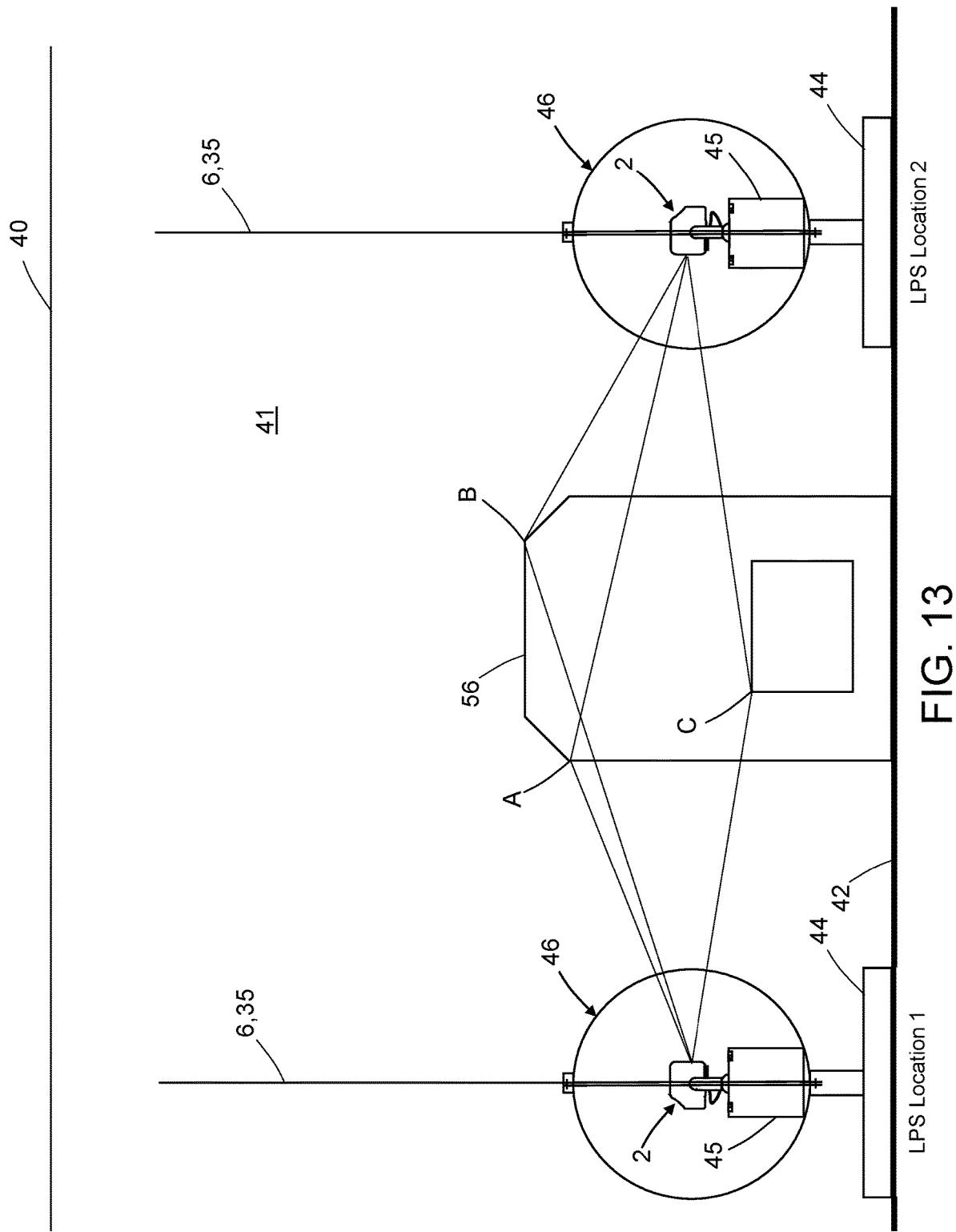
FIG. 13 is a diagram showing aspects of a process for re-calibrating a local positioning system housed in a submerged liquid-tight pressure vessel.

FIG. 13 is a diagram showing aspects of a process for re-calibrating a local positioning system 2 housed in a spherical liquid-tight, optically transparent enclosure 46. While at a first location (i.e., "LPS Location 1" in FIG. 13), the local positioning system 2 may use calibration points A-C (corresponding to calibration points 5a-5c in FIG. 1) to determine its location in the frame of reference of an underwater object 56 (using the calibration method described above with reference to FIG. 1), provided that the position coordinates of the calibration points A-C in the coordinate system of the underwater object 56 are known (e.g., by referring to a CAD model database). After the initial calibration, the local positioning system 2 at the first location may acquire position data regarding other points on the surfaces of underwater object 56 or submerged surfaces of other structures or objects. Following data acquisition at the first location, the local positioning system 2 may be moved to a second location (i.e., "LPS Location 2" in FIG. 13). While at a second location, the local positioning system 2 may use calibration points A-C to re-calibrate (i.e., determine) its location in the frame of reference of the underwater object 56.

If the actual coordinates of the underwater object 56 are not known, then the process can use the relative object localization mode described in U.S. Patent Application Pub. No. 2015/0268033. For the sake of completeness of this disclosure, a method for relative object localization in accordance with one embodiment will now be described in some detail. This relative object localization method may be employed with any one of the multiplicity of embodiments disclosed above. Although the relative object localization method to be disclosed does not give results in the local coordinate system of the target object (as in the process that uses known position data), it can give the position and orientation of an object relative to a starting location, which in many cases may be sufficient for the required task. For example, in some situations a measurement process that had required absolute coordinate measurement may be reformulated into a process that can be performed with only relative offset information. If the measurement task can be defined in terms of position and orientation offsets from a reference location, such as visible landmarks, then the relative process presented here may be able to replace the absolute coordinate process (and known three-dimensional data point positions are not needed).

Figure 14:
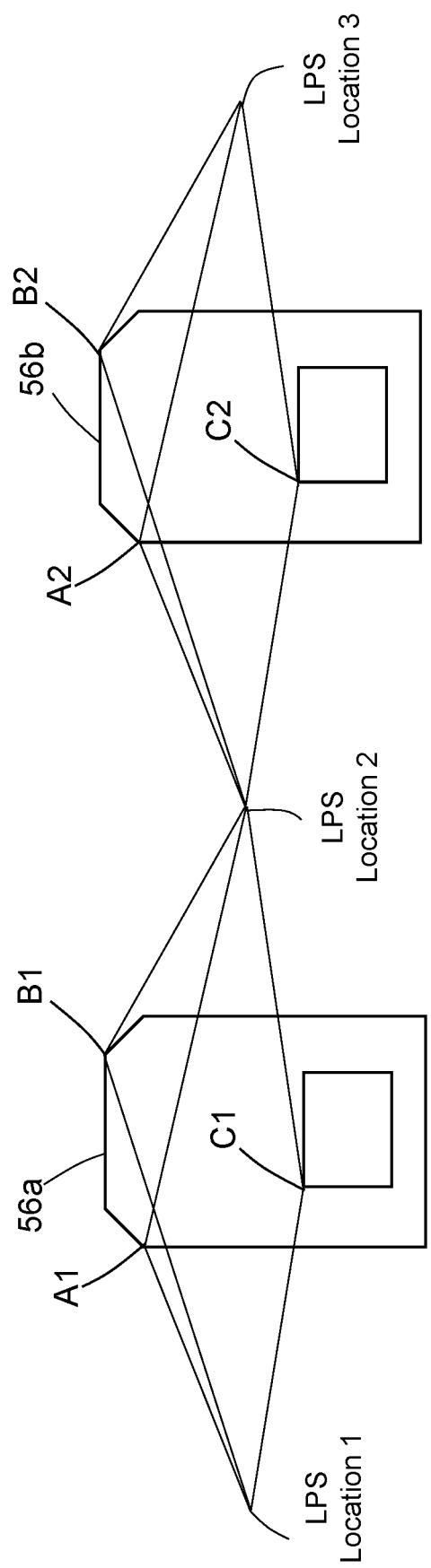
FIG. 14 is a diagram showing aspects of a process for linking adjacent measurement regions with a common coordinate system using a local positioning system housed in a submerged liquid-tight pressure vessel in accordance with one embodiment.

FIG. 14 is a diagram showing aspects of a multi-location sequential re-calibration process for linking adjacent measurement regions with a common coordinate system using a local positioning system 2 contained in a spherical liquid-tight, optically transparent enclosure 46 in accordance with one embodiment. While at a first location (i.e., "LPS Location 1" in FIG. 14), the local positioning system 2 may use calibration points A1, B1 and C1 on the first underwater object 56a to determine the location of those calibration points in the frame of reference of the local positioning system 2 (hereinafter "instrument coordinate system"). In this case, the position coordinates of the calibration points A1, B1 and C1 in the coordinate system of the first underwater object 56a are unknown. After the initial calibration, the local positioning system 2 at the first location may acquire position data regarding other points on the surfaces of first underwater object 56. The coordinates represented by that position data will be given relative to the instrument coordinate system. Following data acquisition at the first location, the local positioning system 2 may be moved to a second location (i.e., "LPS Location 2" in FIG. 14). While at a second location, the local positioning system 2 may use calibration points A1, B1 and C1 to again determine the position coordinates of calibration points A1, B1 and C1 in the instrument coordinate system. Thereafter a first offset transformation matrix may be computed which represents the offset of the second location of the local positioning system 2 relative to the first location of the local positioning system 2.

Thereafter, the orientation (but not the position) of the local positioning system 2 may be changed by known pan and tilt angles to allow calibration with reference to a second underwater object 56b. While at a second location, the local positioning system 2 may use calibration points A2, B2 and C2 on the second underwater object 56b to determine the location of those calibration points in the instrument coordinate system. In this case, the position coordinates of the calibration points A2, B2 and C2 in the coordinate system of the second underwater object 56b are unknown. After the initial calibration with respect to the second underwater object 56b, the local positioning system 2 at the second location may acquire position data regarding other points on the surfaces of the second underwater object 56b. Again the coordinates represented by that position data will be given relative to the instrument coordinate system. Furthermore, a second offset transformation matrix may be computed which represents the offset of the second underwater object 56b relative to the first underwater object 56a. Accordingly, position data acquired from points on the surface of the second underwater object 56b may be precisely spatially related to position data acquired from points on the surface of the first underwater object 56a.

Following data acquisition at the second location, the local positioning system 2 may be moved to a third location (i.e., "LPS Location 3" in FIG. 14). While at a third location, the local positioning system 2 may use calibration points A3, B3 and C3 to again determine the position coordinates of calibration points A3, B3 and C3 in the instrument coordinate system. Thereafter a third offset transformation matrix may be computed which represents the offset of the third location of the local positioning system 2 relative to the second location of the local positioning system 2. The first and third offset transformation matrices may be multiplied to produce a fourth offset transformation matrix that represents the offset of the third location of the local positioning system 2 relative to the first location of the local positioning system 2.

This process may be continued as described with respect to additional underwater objects, thereby linking adjacent measurement regions with a common coordinate system. The method depicted in FIG. 14 enables three-dimensional measurement in submerged environments larger than the range of the local positioning system 2 when the location of the calibration points on the underwater objects of interest in the coordinate system of the particular facility are unknown.

Figure 15:
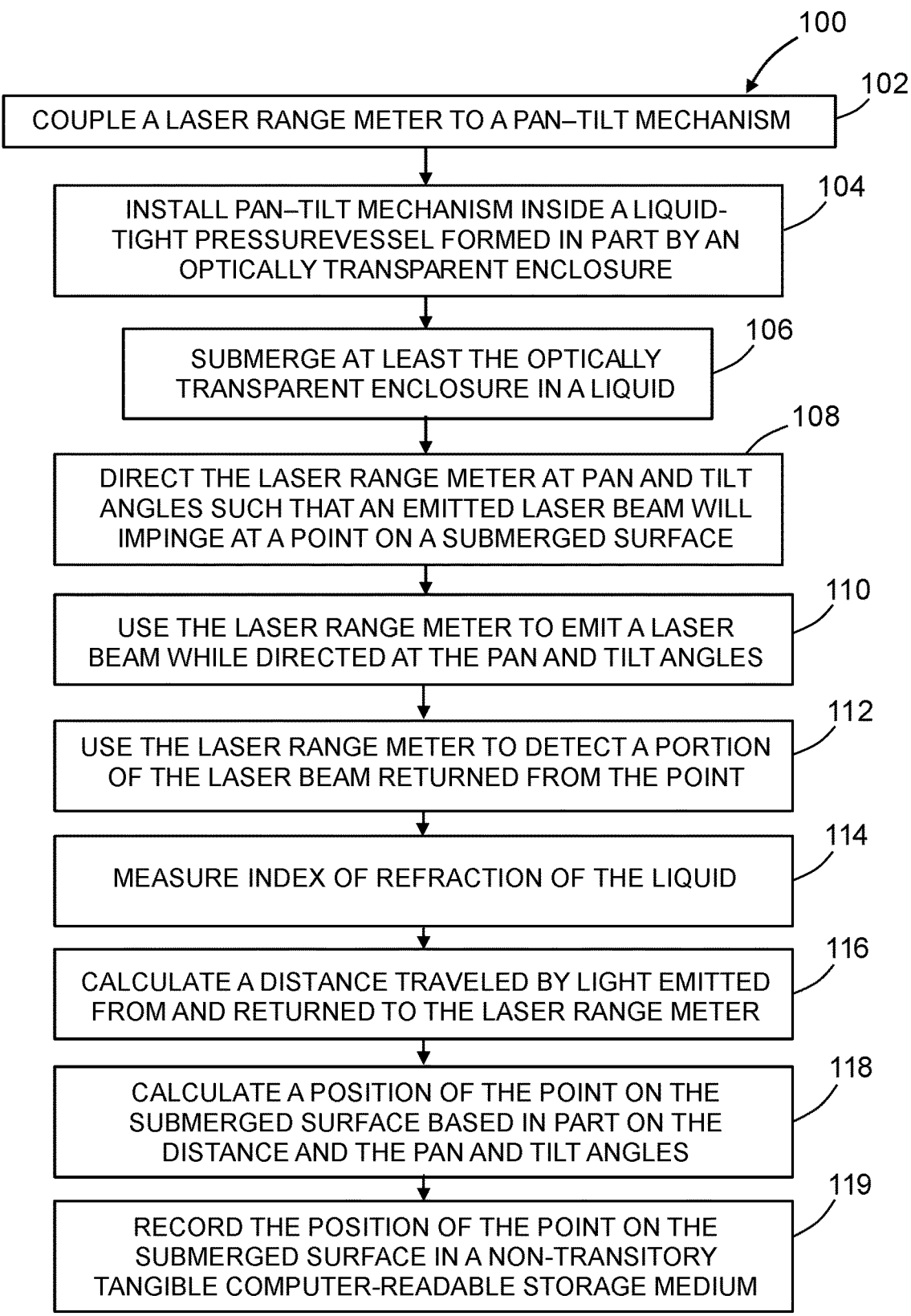
FIG. 15 is a flowchart identifying steps of a method for measuring a position of a point on a submerged surface in accordance with another embodiment.

FIG. 15 is a flowchart identifying steps of a method 100 for measuring a position of a point on a submerged surface in accordance with another embodiment. The method 100 comprises: couple a laser range meter to a pan-tilt mechanism (step 102); install the pan-tilt mechanism inside a liquid-tight pressure vessel formed in part by an optically transparent enclosure (step 104); submerge at least the optically transparent enclosure in a liquid (step 106); direct the laser range meter at pan and tilt angles such that a laser beam emitted by the laser range meter will impinge at a point on a surface submerged in the liquid (step 108); use the laser range meter to emit a laser beam while the laser range meter is directed at the pan and tilt angles (step 110); use the laser range meter to detect a portion of the laser beam returned from the point on the submerged surface (step 112); use a real-time refractive index sensor to measure the index of refraction of the liquid (step 114); calculate a distance traveled by light emitted from and returned to the laser range meter from the point on the submerged surface based in part on the measured index of refraction (step 116); calculate a position of the point on the submerged surface based in part on the distance and the pan and tilt angles (step 118); and record the position of the point on the submerged surface by storing digital data in a non-transitory tangible computer-readable storage medium (step 119). The calculation of the distance traveled by light emitted from and returned to the laser range meter may take into account the respective speeds of light in the media (e.g., air, glass and water) through which the emitted and returned light propagates.

Figure 16:
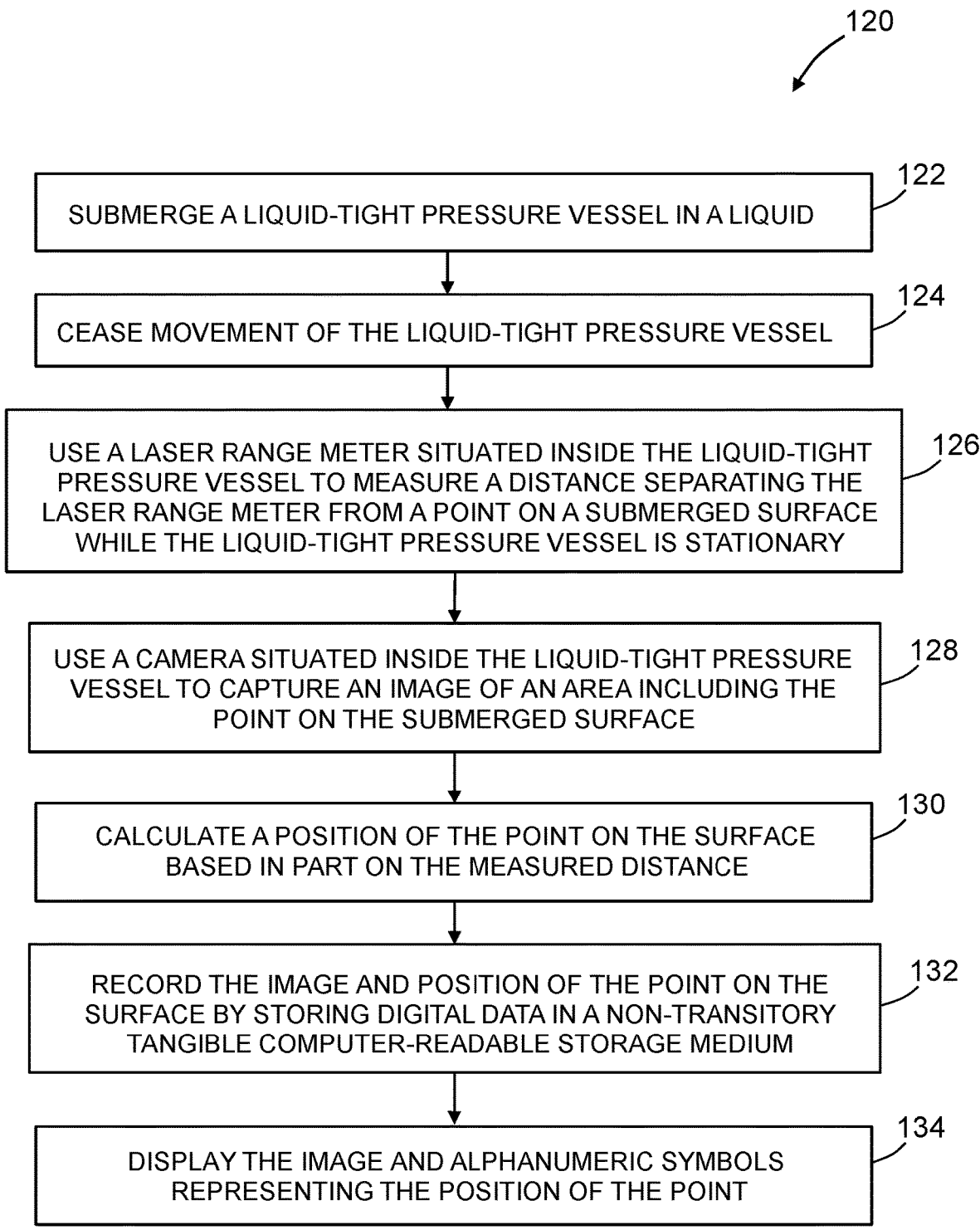
FIG. 16 is a flowchart identifying steps of a method for inspecting and measuring a submerged surface in accordance with a further embodiment.

FIG. 16 is a flowchart identifying steps of a method 120 for inspecting and measuring a submerged surface in accordance with a further embodiment. The method 120 comprises: (a) submerge a liquid-tight pressure vessel in a liquid (step 122); (b) cease movement of the liquid-tight pressure vessel (step 124); (c) use a laser range meter situated inside the liquid-tight pressure vessel to measure a distance separating the laser range meter from a point on a submerged surface of the structure while the liquid-tight pressure vessel is stationary (step 126); (d) use a camera situated inside the liquid-tight pressure vessel to capture an image of an area including the point on the submerged surface (step 128); (e) calculate a position of the point on the submerged surface based in part on the measured distance (step 130); (f) record the image and the position of the point on the surface by storing digital data in a non-transitory tangible computer-readable storage medium (step 132); and (g) display the image and alphanumeric symbols representing the position of the point on a display screen (step 134).

In the above-described embodiments, the local positioning system 2 may include a commercial-of-the shelf (COTS) laser range meter. The range data output by such a COTS laser range meter is based on standard usage conditions i.e., in air at standard temperature and pressure. The range data provided by the COTS laser range meter does not take into account the fact that light travels at different speeds through different materials. For example, the speed of light is: 299,792 km/sec in a vacuum (index of refraction=1); 299,703 km/sec in air (index of refraction=1.000293); 225,407 km/sec in water (index of refraction=1.33); 197,233 km/sec in glass (index of refraction=1.52); 187,370 km/sec in polycarbonate (index of refraction=1.60); and 201,203 km/sec in acrylic (index of refraction=1.49). So when laser light from the laser range meter 14 travels more slowly through the glass enclosure and the surrounding water, the range data output by the COTS laser range meter will not accurately represent the true range to an underwater object 56.

Accordingly, in accordance with one embodiment, the computer system at the control station 24 is configured to compute the actual distance to the underwater object 56 using the raw range data output by the laser range meter 14 and taking into account the speeds of light in the media through which the laser light emitted by the laser range meter 14 propagated. This is done by knowing the speed of light in the various materials through which the light travels along with the known distances through those materials. For example, assume that the optically transparent enclosure 46 is 0.5-inch-thick glass (i.e., $D_1$=0.5 inch) and that the distance $D_2$ from the laser range meter 14 to the air/glass interface of the optically transparent enclosure 46 is 10 Inches (i.e., $D_2$=10 inches). Since the speeds of light and distances traveled in air and glass are known, the propagation times through those media can be calculated. Since the total propagation time of laser light that traveled from the laser range meter 14 to the underwater object 56 and back to the laser range meter 14 may also be calculated from the raw range data $D_{raw}$ output by the laser range meter 14 (which raw range data assumes propagation through air, not water), the propagation time of laser light that traveled from the glass/water interface of the optically transparent enclosure 46 to the underwater object 56 and back to the glass/water interface can also be calculated. That propagation time and the speed of light in water can then be used to calculate the actual distance $D_3$ separating the glass/water interface of the optically transparent enclosure 46 and the underwater object 56. The corrected (i.e., actual) distance $D_{cor}$ separating the laser range meter 14 and the underwater object 56 may then be calculated as the sum of distances $D_1$, $D_2$ and $D_3$ (i.e., $D_{cor}=D_1+D_2+D_3$).

There may be local manufacturing defects in the setup, which will likely be the case with any real-world system. In that case there will be minor variations that can be addressed with equations or table look-ups based on input pan and tilt angles.

Preferably the optically transparent enclosure 46 has a spherical shape in order to deal with the very high compressible forces underwater (especially at greater depths). However, if the laser range meter 14 is not perfectly centered in the optically transparent enclosure 46, then the refraction angles of light for the transitions between materials need to be calculated and used in the processing of the measured aiming angle to compute the actual aiming angle. In situations wherein the laser beam is not normal to the optically transparent enclosure 46, the computer system at the control station 24 may correct the aim angle of the local positioning system 2 (as reflected in the pan and tilt angle data received from the pan-tilt mechanism 16) to take into account refraction of light at the air/glass and glass/water interfaces of the optically transparent enclosure 46.

Figure 17:
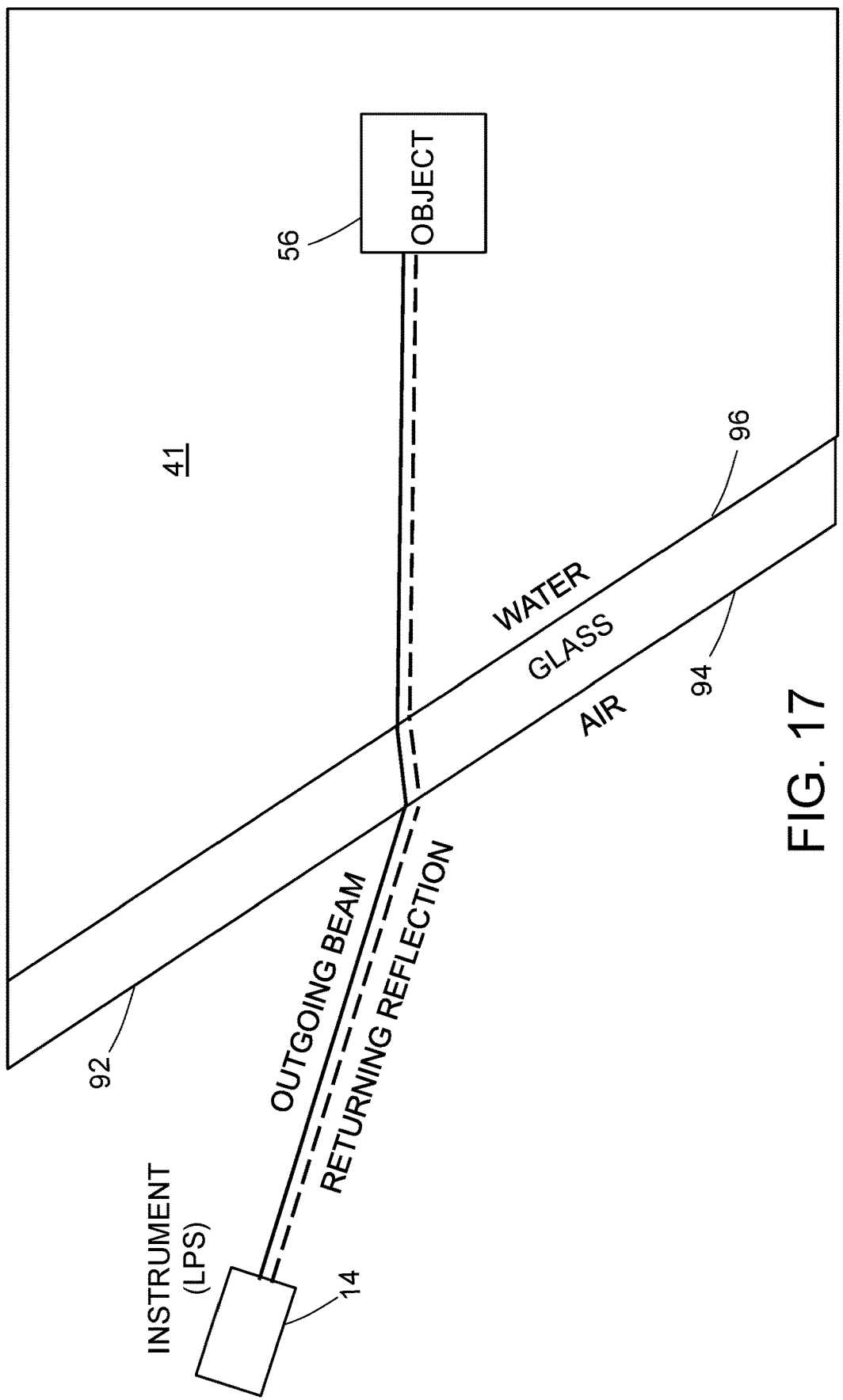
FIG. 17 is a diagram representing the path of laser light emitted by a laser range meter and returned from a target object, which laser light is refracted each time it propagates through an optically transparent enclosure.

The same is true for non-spherical enclosures. There are situations in which measurements may be acquired at shallower depths, which would allow a non-spherical enclosure to be used. For example, the liquid-tight pressure vessel 3 may include a flat rectangular window 92. FIG. 17 is a diagram representing the path of laser light emitted by a laser range meter 14 and returned from a underwater object 56, which laser light is refracted when it impinges at a non-perpendicular angle on and propagates through the air/glass interface 94 and glass/water interface 96 of the flat rectangular window 92. In this case, the computer system at the control station 24 may be configured to compensate for the effects of refraction due to the laser beam impinging on the air/glass and glass/water interfaces of the flat rectangular window 92 at angles different than 90 degrees. If the emitted laser beam is not perpendicular to the window, then the computer system at the control station 24 performs a refraction calculation using data about the environment geometry, i.e., the location of the laser range meter 14 relative to the flat rectangular window 92. There are multiple angles involved due to refraction at the air/glass interface 94 and the glass/water interface 96. Knowing the geometric relationships provides the initial entry angle into the window at the air/glass interface 94; knowing the coefficient of refraction in the water is needed to compute the exit angle at the glass/water interface 96. The aim angle of the local positioning instrument (LPS) would be adjusted to obtain the direct angle to the underwater object 56.

Figure 18:
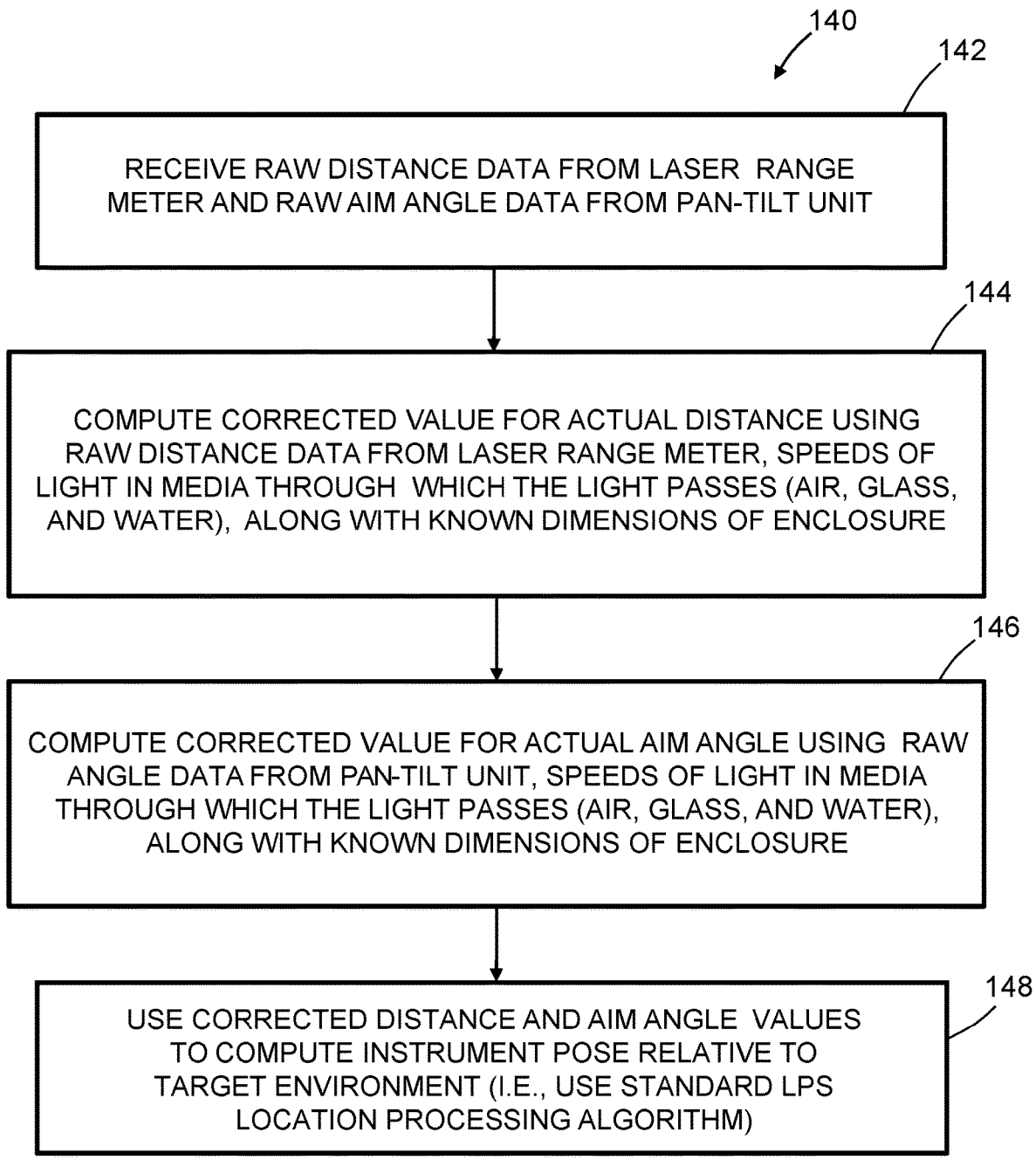
FIG. 18 is a flowchart identifying steps of a method for measuring the coordinates of a point on a submerged surface in accordance with one embodiment.

FIG. 18 is a flowchart identifying steps of a method 140 for measuring the coordinates of a point on a submerged surface in accordance with one embodiment using the above-described correction techniques. The computer system at the control station 24 (see FIG. 2) is configured to execute the following steps of method 140: (a) receive raw distance data from the laser range meter 14 and raw aim angle data from the pan-tilt mechanism 16 (step 142); (b) compute a corrected value for the actual distance using the raw distance data from the laser range meter 14, retrieved data representing the speeds of light in the various media (e.g., air/glass and water) through which the light passes, along with retrieved data representing the dimensions of the optically transparent enclosure (step 144); (c) compute a corrected value for the actual aim angle using the raw angle data from the pan-tilt mechanism 16, retrieved data representing the speeds of light in the various media (e.g., air/glass and water) through which the light passes, along with retrieved data representing the dimensions of the optically transparent enclosure (step 146); and (d) use the corrected distance and aim angle values to compute the instrument (i.e., LPS) pose relative to the target environment (i.e., using the LPS 3-D localization software described above).

Figure 19:
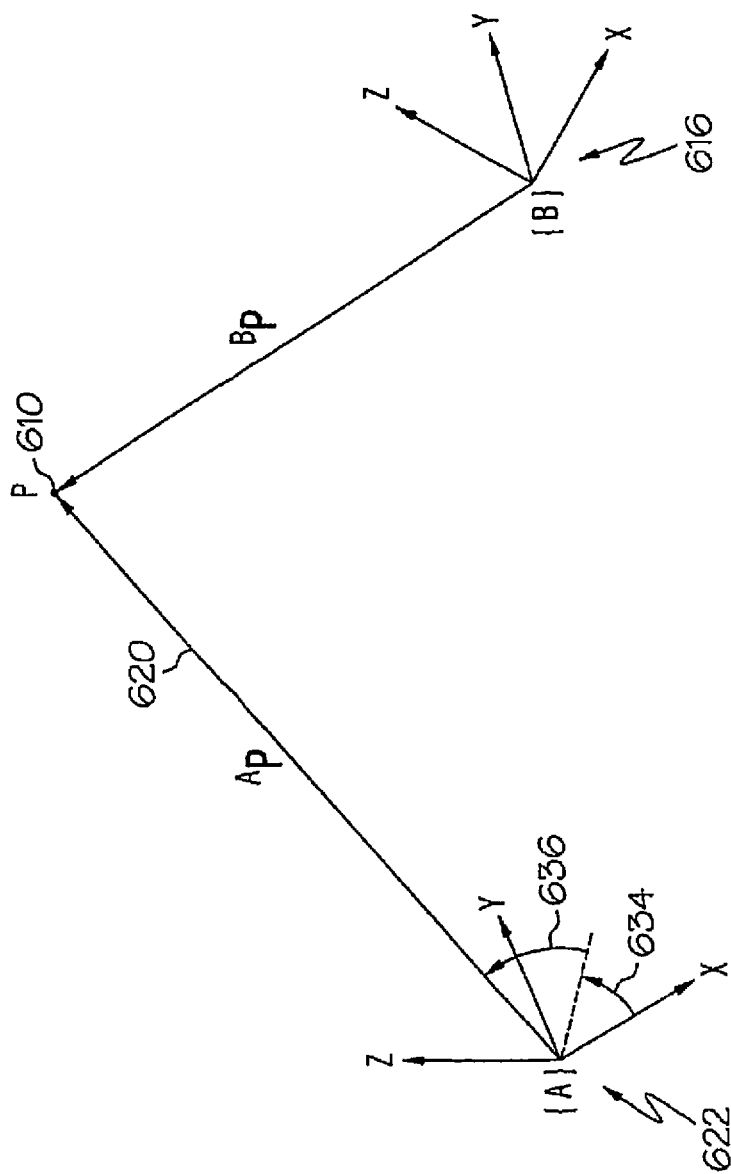
FIG. 19 is a diagram showing a position vector $^{A}P$ extending from the origin of an instrument coordinate system $\{A\}$, substantially along the aim point axis of the instrument, to a point of interest P and showing a position vector $^BP$ extending from the origin of a target object coordinate system {B} to the point of interest P.

FIG. 19 shows a position vector $^{A}P$ extending from the origin of an instrument coordinate system {A}, substantially along the aim point axis of the instrument, to a point of interest P and showing a position vector $^{B}P$ extending from the origin of a target object coordinate system {B} to the point of interest P.

Referring to FIG. 19, when the coordinates of a point P in the instrument coordinate system 622 are spherical coordinates of pan (i.e., the pan angle 634 in FIG. 19 of a vector $^{A}P$ to the point P), tilt (the tilt angle 636 in FIG. 16 of the vector $^{A}P$ to the point P), and range (the distance along the vector $^{A}P$ to the point P in FIG. 19), the position of the point P represented as spherical coordinates in the instrument coordinate system 622 is related to the position of the point P in X,Y,Z Cartesian coordinates in the instrument coordinate system 622 from the following equations for the forward kinematics of the instrument 618:

$$X = \text{Range} \cdot \cos(\text{pan}) \cdot \cos(\text{tilt})$$

$$Y = \text{Range} \cdot \sin(\text{pan}) \cdot \cos(\text{tilt})$$

$$Z = \text{Range} \cdot \sin(\text{tilt})$$

where pan (azimuth) is rotation about the Z axis and tilt (elevation) is rotation about the Y axis in the instrument coordinate system 622.

It is noted that the position of the point P represented as Cartesian coordinates (X,Y,Z) in the instrument coordinate system 622 is related to the position of the point P represented as spherical coordinates (pan, tilt, range) in the instrument coordinate system 622 from the following equations for the inverse kinematics of the instrument 618:

$$\text{pan} = \tan(Y, X)^{-1}$$

$$\text{tilt} = \tan(Z, \sqrt{X^2 + Y^2})^{-1}$$

$$\text{Range} = \sqrt{X^2 + Y^2 + Z^2}$$

In one implementation, a position $^{B}P$ (which is represented as a column vector in the form $[X,Y,Z,1]^T$) in the target object coordinate system 616 is calculated from a position $^{A}P$ (also a column vector in the form $[X,Y,Z,1]^T$) in the instrument coordinate system 622 from the equation:

$$^{B}P = {}^{B}_{A}T\,{}^{A}P$$

where T is the calibration matrix. In one example, the calibration matrix is a 4×4 homogeneous transformation matrix having the form:

$$^{B}_{A}T = \begin{bmatrix} r_{11} & r_{12} & r_{13} & X \\ r_{21} & r_{22} & r_{23} & Y \\ r_{31} & r_{32} & r_{33} & Z \\ 0 & 0 & 0 & 1 \end{bmatrix}$$

It is noted that a position $^{A}P$ in the instrument coordinate system 622 can be calculated from a position in the target object coordinate system 616 using the inverse of the calibration matrix from the equation:

$$^{A}P = ({}^{A}T)^{-1}\,{}^{B}P = {}^{A}_{B}T\,{}^{B}P$$

Figure 21:
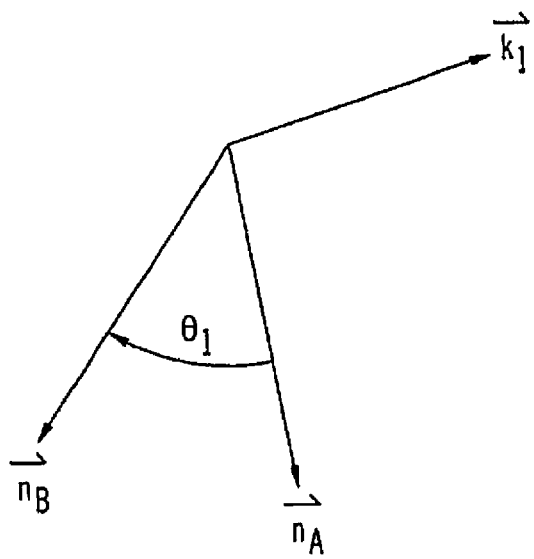
Figure 22:
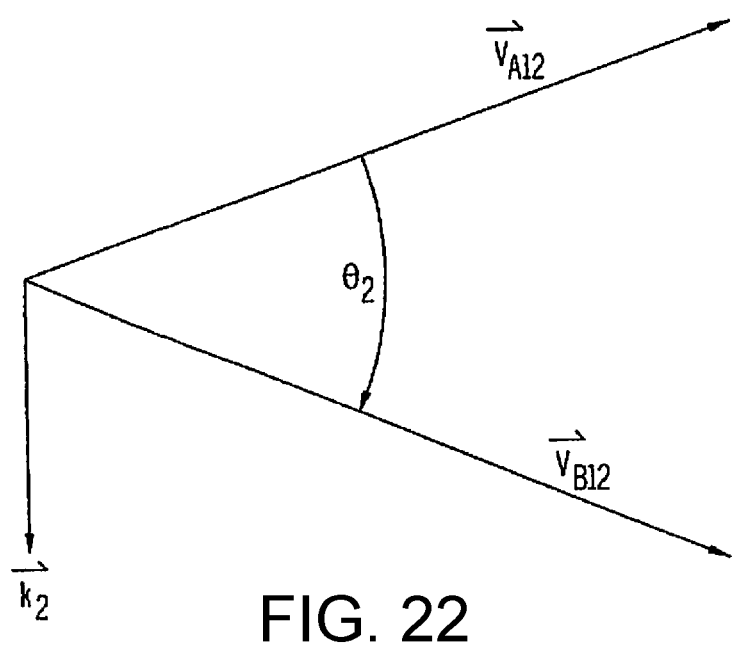

In one example, the three calibration points are non-collinear, and the calibration matrix is calculated as follows:

$$\vec{B}_A = \vec{V}_{A12} \times \vec{V}_{A13}$$

$$\vec{n}_B = \vec{V}_{B12} \times \vec{V}_{B13}$$

$$\vec{k}_1 = \vec{n}_A \times \vec{n}_B$$

$$\theta_1 = \alpha\cos(|\vec{n}_A| \cdot |\vec{n}_B|)$$

$$R_1 = f_1(|\vec{k}_1|, \theta_1)$$

$$\vec{k}_2 = \vec{V}_{A12} \times \vec{V}_{B12}$$

$$\theta_2 = \alpha\cos(|\vec{V}_{A12}| \cdot |\vec{V}_{B12}|)$$

$$R_2 = f_1(|\vec{k}_2|, \theta_2)$$

$$R_{12}=R_1R_2$$

$$_A^BT=[R_{12},[R_1(\vec{V}_{B12}-\vec{V}_{A12})]^T]$$

$$_B^AT=(_A^BT)^{-1}$$

wherein, referring to FIGS. 20-22:

$\vec{V}_{A12}$ is the vector in coordinate system A that extends from point $P_{A1}$ to $P_{A2}$;

$\vec{V}_{A13}$ is the vector in coordinate system A that extends from point $P_{A1}$ to $P_{A3}$;

$\vec{V}_{B12}$ is the vector in coordinate system A that extends from point $P_{B1}$ to $P_{B2}$;

$\vec{V}_{B13}$ is the vector in coordinate system A that extends from point $P_{B1}$ to $P_{B3}$;

$\vec{n}_A$ and $\vec{n}_B$ are the normals created from the vector cross products;

$\vec{k}_1$ and $\vec{k}_2$ are axes of rotation;

$\theta_1$ and $\theta_2$ are rotation angles about axes $\vec{k}_1$ and $\vec{k}_2$, respectively:

$R_1$, $R_2$, and $R_{12}$ are 3×3 symmetric rotation matrices; and $f_1(\ )$ is the function (known to those skilled in the art and described, for example, in "Introduction to Robotics: Mechanics and Control", 3rd edition, by John J. Craig and published July 2004 by Prentice Hall Professional Technical Reference) which generates a 3×3 rotation matrix from the angle-axis definition described below:

$$f_1(\hat{k},\theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

where $c\theta=\cos(\theta)$, $s\theta=\sin(\theta)$, $v\theta=1-\cos(\theta)$, and $\hat{k}=[k_x, k_y, k_z]$.

Note that the 4×4 homogeneous calibration matrix $_A^BT$ only is computed once for any position of the pointing instrument relative to the target object, and $_A^BT$ can then be used to convert any number of vectors from coordinate system A (the instrument coordinate system 622) into coordinate system B (the target object coordinate system 616). It is also noted that the inverse calibration matrix $_B^AT$ can be calculated by calculating the inverse of the calibration matrix $_A^BT$ or can be calculated directly by switching the order of the vectors in the first equations of the previous paragraph.

While systems and methods for acquiring three-dimensional coordinate information for points on submerged target objects undergoing non-destructive inspection have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

As used in the claims, the term "location" comprises position in a three-dimensional coordinate system and orientation relative to that coordinate system. As used in the claims, the term "point" should be construed broadly to include at least a centroid or other point within a laser spot formed when a laser beam impinges on a surface.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An apparatus for measuring a position of a point on a submerged surface, comprising:
   a platform;
   a liquid-tight pressure vessel fixedly coupled to the platform, wherein the liquid-tight pressure vessel is formed in part by an optically transparent enclosure;
   a pan-tilt mechanism coupled to the platform and disposed inside the liquid-tight pressure vessel;
   a camera mounted to the pan-tilt mechanism;
   a laser range meter affixed to the camera and configured to project a laser beam onto a target object along an aim direction vector determined by the pan-tilt mechanism and then output range data representing a measured distance to the target object;
   a computer system programmed to control operation of the pan-tilt mechanism, the camera, and the laser range meter;
   a refractive index sensor coupled to and disposed outside the liquid-tight pressure vessel, wherein the refractive index sensor comprises a processor configured to acquire index of refraction data for a liquid in which the refractive index sensor is immersed; and
   a computer or processor which is communicatively coupled to the first computer system and which is programmed to process the range data received from the laser range meter, pan and tilt angles received from the pan-tilt mechanism, and the index of refraction data from the refractive index sensor and then compute a corrected distance to the target object taking into account a speed of light in the liquid and compute a corrected aim angle taking into account refraction of light at air/glass and glass/liquid interfaces of the optically transparent enclosure, wherein the speed of light in the liquid and the refraction of light at the glass/liquid interface are calculated based on the index of refraction data.

2. The apparatus as recited in claim 1, wherein the optically transparent enclosure is spherical.

3. The apparatus as recited in claim 2, wherein the pan-tilt mechanism has a pan axis and a tilt axis that intersect at a center of the optically transparent enclosure and the laser range meter is located to emit a laser beam that is perpendicular to the optically transparent enclosure at a multiplicity of different points of impingement on the optically transparent enclosure.

4. The apparatus as recited in claim 1, further comprising:
a cable holder affixed to the optically transparent enclosure; and
a tether cable attached or tied to the cable holder.

5. The apparatus as recited in claim 1, wherein the platform and liquid-tight pressure vessel are configured to float when the liquid-tight pressure vessel is submerged in water.

6. The apparatus as recited in claim 1, wherein the platform comprises first and second thrusters.

7. The apparatus as recited in claim 1, wherein the platform comprises first and second endless tracks.

8. The apparatus as recited in claim 1, wherein the platform comprises first and second landing rails.

9. The apparatus as recited in claim 1, wherein the platform is configured to move holonomically.

10. The apparatus as recited in claim 9, wherein the platform comprises first through fourth Mecanum wheels.

11. The apparatus as recited in claim 1, wherein the platform comprises first and second electro-magnets.

12. A method for measuring a position of a point on a submerged surface, comprising:
coupling a laser range meter to a pan-tilt mechanism;
installing the pan-tilt mechanism inside a liquid-tight pressure vessel formed in part by an optically transparent enclosure;
installing a refractive index sensor outside the liquid-tight pressure vessel;
submerging at least the optically transparent enclosure in a liquid;
directing the laser range meter at pan and tilt angles such that a laser beam emitted by the laser range meter will impinge at a point on a surface submerged in the liquid;
using the refractive index sensor to measure an index of refraction of the liquid;
calculating a speed of light in the liquid based on the measured index of refraction;
using the laser range meter to emit a laser beam while the laser range meter is directed at the pan and tilt angles;
using the laser range meter to detect a portion of the laser beam returned from the point on the submerged surface;
calculating a distance traveled by light emitted from and returned to the laser range meter taking into account the calculated speed of light in the liquid;
calculating an aim angle of the light emitted from the laser range meter taking into account refraction of light at air/glass and glass/liquid interfaces of the optically transparent enclosure, wherein the refraction of light at the glass/liquid interface is calculated based on the measured index of refraction;
calculating a position of the point on the submerged surface based in part on the distance calculated and the aim angle calculated; and
recording the position of the point on the submerged surface by storing digital data in a non-transitory tangible computer-readable storage medium.

13. The method as recited in claim 12, further comprising using the laser range meter to link adjacent measurement regions in a submerged environment with a common coordinate system, wherein the submerged surface is a part of the submerged environment.

14. The method as recited in claim 12, further comprising:
calibrating the pan-tilt mechanism relative to a frame of reference; and
converting the distance and pan and tilt angles into a Cartesian coordinate vector representing the position of the point in the frame of reference.

15. The method as recited in claim 14, wherein the submerged surface is a surface of a target object and the frame of reference is a frame of reference of the target object, and the calibrating step comprises:
aiming the laser range meter at three or more calibration points on the submerged surface at different times while the liquid-tight pressure vessel is stationary; and
computing a calibration matrix representing a transformation from a frame of reference of the pan-tilt mechanism to the frame of reference of the target object.

16. The method as recited in claim 15, wherein the calibrating step further comprises:
measuring the pan and tilt angles of the pan-tilt mechanism while the laser range meter is aimed at each calibration point; and
measuring the distance separating the laser range meter and each calibration point while the laser range meter is aimed at each calibration point.

17. A method for inspecting and measuring a submerged surface of a structure comprising:
(a) submerging a liquid-tight pressure vessel formed in part by an optically transparent enclosure in a liquid;
(b) ceasing movement of the liquid-tight pressure vessel;
(c) using a laser range meter situated inside the liquid-tight pressure vessel and a refractive index sensor situated outside the liquid-tight pressure vessel to calculate a distance separating the laser range meter from a point on the submerged surface of the structure while the liquid-tight pressure vessel is stationary taking into account the calculated speed of light in the liquid;
(d) calculating an aim angle of light emitted from the laser range meter taking into account refraction of light at air/glass and glass/liquid interfaces of the optically transparent enclosure;
(e) using a camera situated inside the liquid-tight pressure vessel to capture an image of an area including the point on the submerged surface; and
(f) calculating a position of the point on the surface based in part on the distance calculated and the aim angle calculated,
wherein the speed of light in the liquid and the refraction of light at the glass/liquid interface are calculated based on index of refraction data acquired by the refractive index sensor.

18. The method as recited in claim 17, further comprising recording the image and the position of the point on the surface by storing digital data in a non-transitory tangible computer-readable storage medium.

19. The method as recited in claim 17, further comprising displaying the image and alphanumeric symbols representing the position of the point on a display screen.

20. The method as recited in claim 17, wherein step (c) comprises using the laser range meter to emit a laser beam and then detect a portion of the laser beam returned from the point on the submerged surface.

21. The method as recited in claim 17, further comprising using the laser range meter to link adjacent measurement regions in a submerged environment with a common coordinate system, wherein the submerged surface is a part of the submerged environment.

22. The method as recited in claim 17, further comprising:
calibrating a pan-tilt mechanism situated inside the liquid-tight pressure vessel relative to a frame of reference; and
converting the distance and pan and tilt angles into a Cartesian coordinate vector representing the position of the point in the frame of reference.

23. The apparatus as recited in claim 1, wherein the camera has a focal axis and the laser range meter has an axis that is parallel with the focal axis of the camera.

* * * * *